United States Patent
Oberheim

(10) Patent No.: US 8,960,323 B2
(45) Date of Patent: Feb. 24, 2015

(54) SEMI-ACTIVE ANTI-VIBRATION SYSTEMS FOR HANDHELD ELECTRICAL POWER TOOLS

(75) Inventor: Stephen C. Oberheim, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 698 days.

(21) Appl. No.: 13/276,019

(22) Filed: Oct. 18, 2011

(65) Prior Publication Data

US 2013/0092408 A1    Apr. 18, 2013

(51) Int. Cl.
| | |
|---|---|
| *B23D 49/16* | (2006.01) |
| *F16F 9/30* | (2006.01) |
| *F16F 9/53* | (2006.01) |
| *B23D 21/02* | (2006.01) |
| *B23D 51/02* | (2006.01) |
| *B25F 5/00* | (2006.01) |

(52) U.S. Cl.
CPC ............... *B23D 51/02* (2013.01); *B25F 5/006* (2013.01)
USPC .......... 173/1; 173/162.1; 173/162.2; 173/170; 173/171; 16/431; 30/392

(58) Field of Classification Search
CPC ........... B23D 49/16; B23D 21/02; F16F 9/30; F16F 9/53; B25F 5/006
USPC .......... 173/1, 162.1, 162.2, 170, 171; 30/392; 16/431
See application file for complete search history.

(56) References Cited

U.S. PATENT DOCUMENTS

| | | | |
|---|---|---|---|
| 5,062,657 | A | 11/1991 | Majeed |
| 5,213,167 | A | 5/1993 | Best et al. |
| 5,536,059 | A | 7/1996 | Amirouche |
| 5,712,783 | A | 1/1998 | Catanzarite |
| 5,816,587 | A | 10/1998 | Stewart et al. |
| 5,839,517 | A | 11/1998 | Gwinn et al. |
| 5,845,236 | A | 12/1998 | Jolly et al. |
| 5,931,879 | A | 8/1999 | Neumann et al. |
| 5,984,233 | A | 11/1999 | Snyder, Jr. et al. |
| 6,082,719 | A | 7/2000 | Shtarkman et al. |

(Continued)

FOREIGN PATENT DOCUMENTS

| | | |
|---|---|---|
| DE | 196 53 242 A1 | 6/1998 |
| EP | 1 415 768 A1 | 5/2004 |

(Continued)

OTHER PUBLICATIONS

Kallio, Marke, "The Elastic and Damping Properties of Magnetorheological Elastomers," Thesis, VTT Publications 565, May 27, 2005, pp. 1-149.

(Continued)

*Primary Examiner* — Michelle Lopez
(74) *Attorney, Agent, or Firm* — Maginot Moore & Beck LLP

(57) ABSTRACT

An improved vibration dampening system has been developed for handheld electrical power tools. The vibration dampening system includes a material that a controller selectively activates with an electrical current to increase the rigidity of the material and dampen random vibrations detected by the controller. The material is positioned between a foot member that helps support the tool against a work piece and both hand grips for the tool. Thus, the vibration dampening system reduces the impact of random vibrations on both hands of an operator.

18 Claims, 11 Drawing Sheets

(56) References Cited

U.S. PATENT DOCUMENTS

| | | | |
|---|---|---|---|
| 6,115,658 | A | 9/2000 | Ahmadian et al. |
| 6,129,177 | A | 10/2000 | Gwinn |
| 6,267,364 | B1 | 7/2001 | Zhang |
| 6,311,110 | B1 | 10/2001 | Ivers et al. |
| 6,317,988 | B1 | 11/2001 | Tachibana et al. |
| 6,904,344 | B2 | 6/2005 | LaPlante et al. |
| 7,036,612 | B1 | 5/2006 | Raymond et al. |
| 7,070,027 | B2 | 7/2006 | Manecke et al. |
| 7,320,369 | B2 | 1/2008 | Stirm et al. |
| 7,526,868 | B2 | 5/2009 | Oki et al. |
| 7,726,452 | B2 | 6/2010 | Kraner |
| 2004/0126565 | A1 | 7/2004 | Naganathan et al. |
| 2004/0244207 | A1 | 12/2004 | Menzel et al. |
| 2005/0011710 | A1 | 1/2005 | Hitchcock et al. |
| 2009/0218114 | A1 | 9/2009 | Ohlendorf et al. |
| 2010/0057260 | A1 | 3/2010 | Fallahi |
| 2010/0223760 | A1 | 9/2010 | Henke et al. |
| 2011/0061245 | A1 | 3/2011 | Oberheim |

FOREIGN PATENT DOCUMENTS

| | | |
|---|---|---|
| EP | 1 464 449 A2 | 10/2004 |
| EP | 1 666 182 A1 | 6/2006 |

OTHER PUBLICATIONS

Konstanzer, Peter, "Recent Advances in Eurocopter's Passive and Active Vibration Control," American Helicopter Society International, Inc., 2008, pp. 1-18.

Lache, Simona, "Complex Study on Hand-Arm System Exposed to Vibrations," WSEAS Transactions on Applied and Theoretical Mechanics, Issue 11, vol. 2, Nov. 2007, pp. 215-227.

Lache, Simona, "Upon Parametric Sensitivity Used in Damping Active Control for Human Body Protection Against Vibrations," Proceedings of the 2nd WSEAS Int. Conference on Applied and Theoretical Mechanics, Venice, Italy, Nov. 20-22, 2006, pp. 168-173.

Lerner, A. Albanese and Cunefare, K.A., "Performance of MRE-Based Vibration Absorbers," Journal of Intelligent Material Systems and Structures, vol. 19, May 2007, pp. 551-563.

Liu, Y., et al., "A Comparison of Semi-Active Damping Control Strategies for Vibration Isolation of Harmonic Disturbances," Journal of Sound and Vibration 280, 2003, pp. 21-39.

Makita, Image of Rotary Hammer, AVT Anti Vibration Technology, Available prior to Sep. 1, 2010.

Mayton, Alan G., et al., "Laboratory Investigation of Seat Suspension Performance During Vibration Testing," National Institute for Occupational Safety and Health, Pittsburgh Research Laboratory, Available prior to Sep. 1, 2010, pp. 1-7.

Nguyen, Minh, a Dissertation entitled: "A Novel Semi-Active Magnetorheological Mount for Vibration Isolation," The University of Toledo, Aug. 2009, pp. 1-146.

Olabi, A.G. and Grunwald, A., "Design and Application of Magneto-Rheological Fluid "MRF"," Dublin City University, School of Mechanical and Manufacturing Engineering, pp. 1-19.

Priyandoko, Gigih, et al., "Practical Implementation of Skyhook and Adaptive Active Force Control to an Automotive Suspension System," Department of Applied Mechanics, Faculty of Mechanical Engineering, available prior to Sep. 1, 2010, pp. 1-6.

Rivaz, Hassan and Rohling, Robert, "An Active Dynamic Vibration Absorber for a Hand-Held Vibro-Elastography Probe," Journal of Vibration and Acoustics, vol. 129, Feb. 2007, pp. 101-112.

Savaresi, Sergio M. and Spelta, Cristiano, "Mixed Sky-Hook and ADD: Approaching the Filtering Limits of a Semi-Active Suspension," Transactions of the ASME, vol. 129, Jul. 2007, pp. 382-392.

Shen, Y. et al., "Semi-Active Vibration Control Schemes for Suspension Systems Using Magnetorheological Dampers," Journal of Vibration and Control 2006 12: pp. 3-24.

Snowden, Sketches, available prior to Sep. 1, 2010 (1 page).

Song, Xubin, "Cost-Effective Skyhook Control for Semiactive Vehicle Suspension Applications," The Open Mechanical Engineering Journal, 2009, 3, pp. 17-25.

Song, Xubin, "Chapter 4 Practical Implementations of Semiactive Skyhook Control," available prior to Sep. 1, 2010, pp. 51-77.

Strydom, JPD, a dissertation on "The Attenuation of Rock Drill Vibration" submitted to the University of Pretoria, Jan. 2000, pp. 1-124.

Sun, J. Q., et al., "Passive, Adaptive and Active Tuned Vibration Absorbers a Survey," Transactions of the ASME, vol. 117, Jun. 1995, pp. 234-242.

Valero, Bertrand, et al., "Comparison of Passive Seat Suspension with Different Configuration of Seat Pads and Active Seat Suspension," article, available prior to Sep. 1, 2010, pp. 1-5.

Woo, David, et al., "Frontal Crash Mitigation Using MR Impact Damper for Controllable Bumper," Journal of Intelligent Material Systems and Structures 2007: vol. 18, pp. 1211-1215.

Li, Weihua and Zhang, Xianzhou, "Research and Applications of MR Elastomers," Recent Patents on Mechanical Engineering 2008, vol. 1, pp. 161-166.

Commercial Vibration Exposure Meter website http://www.reactec-.com/havmeter/semiactive-damper; available prior to Sep. 1, 2010.

Ahmadian, M. et al, "No-Jerk Skyhook Control Methods for Semiactive Suspensions," Transactions of the ASME, vol. 126, Oct. 2004, pp. 580-584.

Anderson, Walter Bradley, "Parametric Investigation Toward Achieving an Optimal Magnetorheological Mount," a Thesis to the University of Toledo, May 2010.

Carlson, J. David, Jolly, Mark R., "MR Fluid, Foam and Elastomer Devices," Mechatronics 10, 2000, pp. 555-569.

Chapter 2 Background, pp. 9-21, Available prior to Sep. 1, 2010.

Chapter 4, "Practical Implementation of Semiactive Skyhook Control," pp. 51-77, Available prior to Sep. 1, 2010.

Chen, Yi, "Skyhook Surface Sliding Mode Control on Semi-Active Vehicle Suspension System for Ride Comfort Enhancement," Engineering, 2009, 1, pp. 1-54.

Colla, Enrico L., "Piezoelectric Technology for Active Vibration Control," pp. 1-37, Available prior to Sep. 1, 2010.

Delivorias, R.P., " Research on Smart Materials: Application of ER and MR Fluid in an Automotive Crash Energy Absorber," Eindhoven, Mar. 16, 2004, pp. 1-160.

Gavin, Henri, et al., "Optimal Design of Mr. Dampers," Proc.U.S.-Japan Workshop on Smart Structures for Improved Seismic Performance in Urban Regions, Aug. 14, 2001, Seattle WA,, pp. 1-12.

Golysheva, E.V. et al., "Vibration Protection for an Operator of a Hand-Held Percussion Machine," Journal of Sound and Vibration 274, 2004, pp. 351-367.

Hao, Ko Ying, et al., "The Design and Development of Suspended Handles for Reducing Hand-Arm Vibration in Petrol Driven Grass Trimmer," International Journal of Industrial Ergonomics xxx, Apr. 2011, pp. 1-12.

Hassan, M.F., et al., "Vibration Suppression of a Handheld Tool Using Active Force Control with Crude Approximation Method," Proceedings of the International Conference on Man-Machine Systems, Oct. 11-13, 2009, Batu Ferringhi, Penang, Malaysia, pp. 4A1-1-4A1-6.

Hassan, M.F., et al., "Vibration Suppression of a Handheld Tool Using Intelligent Active Force Control (AFC)," Proceedings of the World Congress on Engineering 2010, vol. II.

Hong, S.R., et al., "Comparison of Vibration Control Performance Between Flow and Squeeze Mode ER Mounts: Experimental Work," Journal of Sound and Vibration 291, 2006, pp. 740-748.

Brigley, Mikel et al., "Experimental and Theoretical Development of Multiple Fluid Mode Magnetorheological Isolators," Journal of Guidance, Control, and Dynamics, vol. 31, No. 3, May-Jun. 2008 (11 pages).

Hu et al., "Semi-Active Linear Stroke Magnetorheological Fluid-Elastic Helicopter Lag Dampener," Journal of Guidance, Control, and Dynamics, vol. 30, No. 2, Mar.-Apr. 2007 (11 pages).

Clarke, Roy et al., "Dynamics of Nanomagnetic MR Elastomers," Ford Motor Company, Research Laboratory, Available prior to Sep. 1, 2010 (3 pages).

Holdhusen, Mark, "The State-Switched Absorber Used for Vibration Control of Continuous Systems," Georgia Institute of Technology, Feb. 2005 (104 pages).

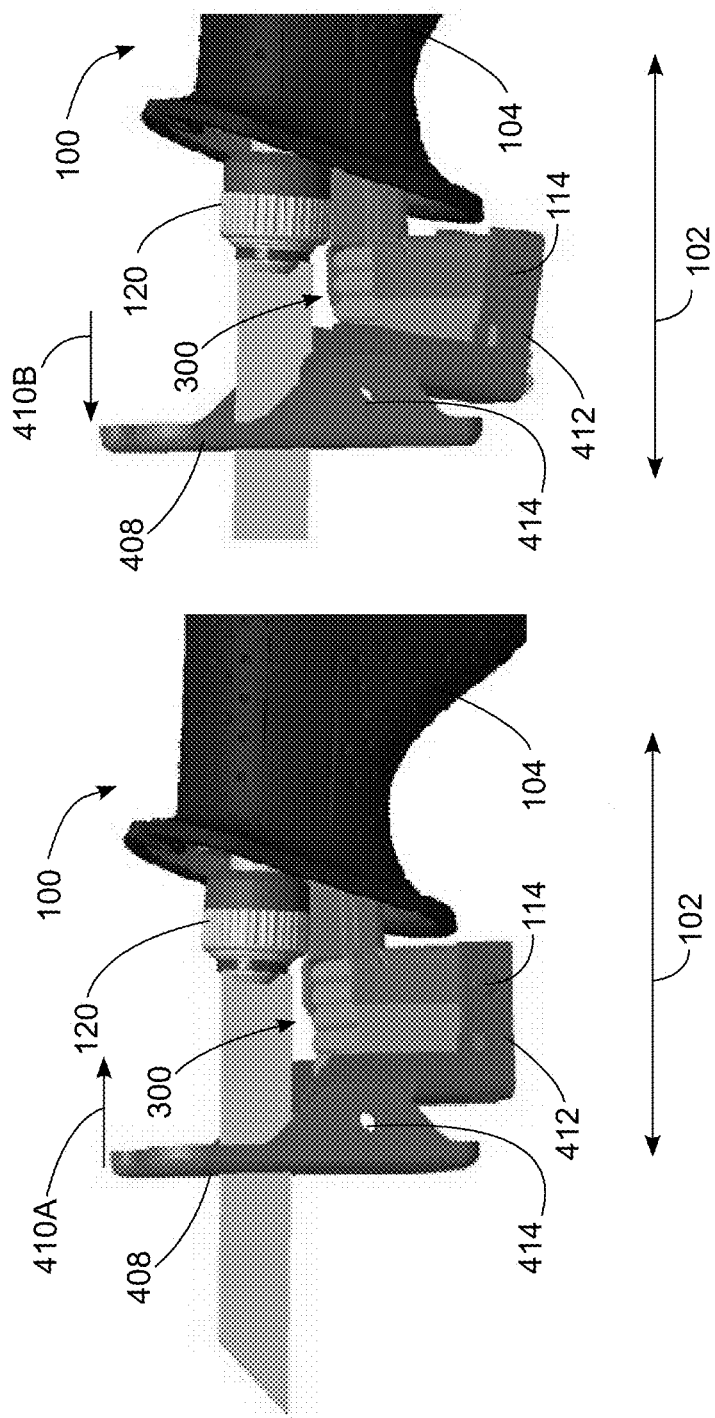

SEMI-ACTIVE ANTI-VIBRATION SYSTEMS FOR HANDHELD ELECTRICAL POWER TOOLS

TECHNICAL FIELD

This patent relates generally to the field of power tools, and, more particularly, to methods and systems for reducing vibration in handheld power tools.

BACKGROUND

Handheld power tools, including reciprocating saws, are used by professionals in many industries, including construction, manufacturing, and outdoor landscaping, on a regular basis. During operation of the handheld tool, various vibrational forces are generated in the tool and some of the vibrations are transmitted to the hands and body of the operator. Some vibrations are regular, such as vibrations from a reciprocating motor and saw blade that repeat at a regular interval corresponding to the operation of the saw. Other vibrations occur randomly, such as those vibrations generated by interactions between a saw blade and a work piece or those produced by a footpad through which the reciprocating tool moves and the work piece as the footpad bounces into and out of contact with the work piece. Both regular and random vibrations are transmitted from the power tool to the hands of the operator who uses the tool. Prolonged exposure to vibration can result in discomfort to the operator, and government regulations in some countries place daily limits on operator exposure to a range of vibrational levels for workers who use handheld power tools.

Low-frequency random vibrations are known to have a larger overall effect on the operator of a hand-held tool. FIG. 12 depicts a weighting chart used with the ISO-5439 standard, which is a well-known standard related to quantifying the effect of vibrations on humans. The weighting factor identified by the line depicted in the weighting chart of FIG. 12 increases from an initial value at a vibration of 1 Hz to a maximum around a vibration frequency of 12.5 Hz. The weighting factor corresponds to the relative effect of vibration at a given frequency on the operator of the handheld power tool. As depicted in FIG. 12, the effects of low frequency vibrations, especially vibrations from about 1.75 Hz to about 250 Hz, are much greater than higher frequency vibrations. Consequently, a vibrational dampener that dampens low-frequency vibrations effectively can benefit an operator more than a high-frequency vibrational dampener.

Various devices and techniques are known to reduce the amount of vibration that an operator experiences when operating a handheld power tool. Some tools include passive vibrational dampeners that use rubber members and springs to reduce the level of vibration that an operator experiences as the tool operates. Passive vibrational dampeners can reduce the magnitude of vibrations that the operator experiences while using the tool, but the passive vibrational dampeners are generally not effective in dampening random vibrations. In particular, the passive vibrational dampeners have resonant frequencies that match low-frequency random vibrations of less than 250 Hertz, and medical data indicate that low-frequency vibrations are also responsible for a majority of the discomfort that an operator experiences while operating the power tool. When exposed to random vibrations near the resonant frequency of the passive dampener, the passive vibrational dampeners experience sympathetic vibration and can amplify the vibrational forces instead of dampening the vibration.

Other disadvantages of passive elastomeric vibrational dampeners include the sizes of the dampeners and the temperature response of the elastomeric materials. In a compact handheld tool, the volume of elastomeric material needed to effectively dampen vibration is often too large to fit inside the tool. Additionally, the vibration dampening coefficients of passive materials vary as the temperature of the power tool changes. In a "cold" state as the power tool begins operation, the elastomeric material may be too rigid to effectively dampen vibrations. As the temperature of the power tool increases during operation, the elastomeric material softens and may become too soft to effectively dampen vibration. Typical elastomeric materials are incapable of providing effective vibrational dampening over a wide range of temperatures.

Another type of vibrational dampening device includes semi-active vibrational dampeners. A semi-active vibrational dampener is a vibrational dampener that adjusts a damping coefficient of the vibrational dampener dynamically. A control circuit typically adjusts the dampening coefficient based on one or more vibrations in the handheld power tool. While semi-active dampening devices can have advantages over passive dampening devices, using a semi-active dampening device in a handheld power tool also presents various challenges. One challenge is that handheld power tools, such as reciprocating saws, typically have a limited amount of space to accommodate the vibrational dampener while also being small enough for an operator to hold comfortably. Existing power tool designs have placed a small semi-active dampener in a rear handle of the power tool. The design of the handle limits the size of the vibrational dampener, and even if the vibrational dampener is effective, the vibrational dampener only reduces vibration experienced at the rear handle. Frequently, operators place at least one hand in locations other than the rear handle. Consequently, the existing semi-active systems cannot effectively dampen vibration that is transmitted to both hands of the operator positioned at different positions on the tool.

As described above, both the passive and semi-active vibration dampening systems known to the art have drawbacks when incorporated into handheld tools. Consequently, improvements to the design of handheld tools that enable improved vibrational dampening for two-handed operation would be beneficial.

SUMMARY

In one embodiment, a handheld reciprocating saw has been developed. The saw includes a housing forming a first grip configured to engage one hand of an operator and a second grip configured to engage another hand of the operator, an electrical motor located in the housing that is configured to drive a tool, a foot member outside the housing that is configured to engage a work piece and support the housing and the electrical motor with reference to the work piece, a movable member operatively connected to the housing and to the foot member, a vibrational dampener positioned proximate to the foot member and operatively connected to the movable member, the vibrational dampener including a variable rheological material, and a controller located in the housing and operatively connected to the vibrational dampener. The movable member is configured to move from a first position to a second position in response to a movement of the foot member toward the housing and to move from the second position to the first position in response to a movement of the foot member away from the housing. The controller is configured to selectively activate an electric current to adjust a mechanical resistance of the variable rheological material to dampen vibrational forces transmitted to the first grip and the second grip during operation of the electrical motor.

In another embodiment, a method of operating a handheld reciprocating saw has been developed. The method includes driving a tool with an electrical motor located in a housing of the handheld electrical power tool, the housing having a first hand grip and a second hand grip, moving a movable member mechanically connected between the housing and a foot member configured to support the handheld electrical power tool with reference to a work piece, the foot member being between the work piece and the first and the second hand grips and the movable member moving from a first position to a second position in response to the foot member moving toward the housing and from the second position to the first position in response to the foot member moving away from the housing during the driving of the tool with the electrical motor, and selectively activating an electric current to adjust a mechanical resistance of a variable rheological material in a vibrational dampener located proximate to the foot member to dampen the vibrational force transmitted between the foot member and the housing.

BRIEF DESCRIPTION OF THE DRAWINGS

FIG. 4A is a side view of a vibrational dampener in an undeformed configuration.

FIG. 4B is a side view of the vibrational dampener of FIG. 4A in a deformed configuration.

DETAILED DESCRIPTION

Figure 1:
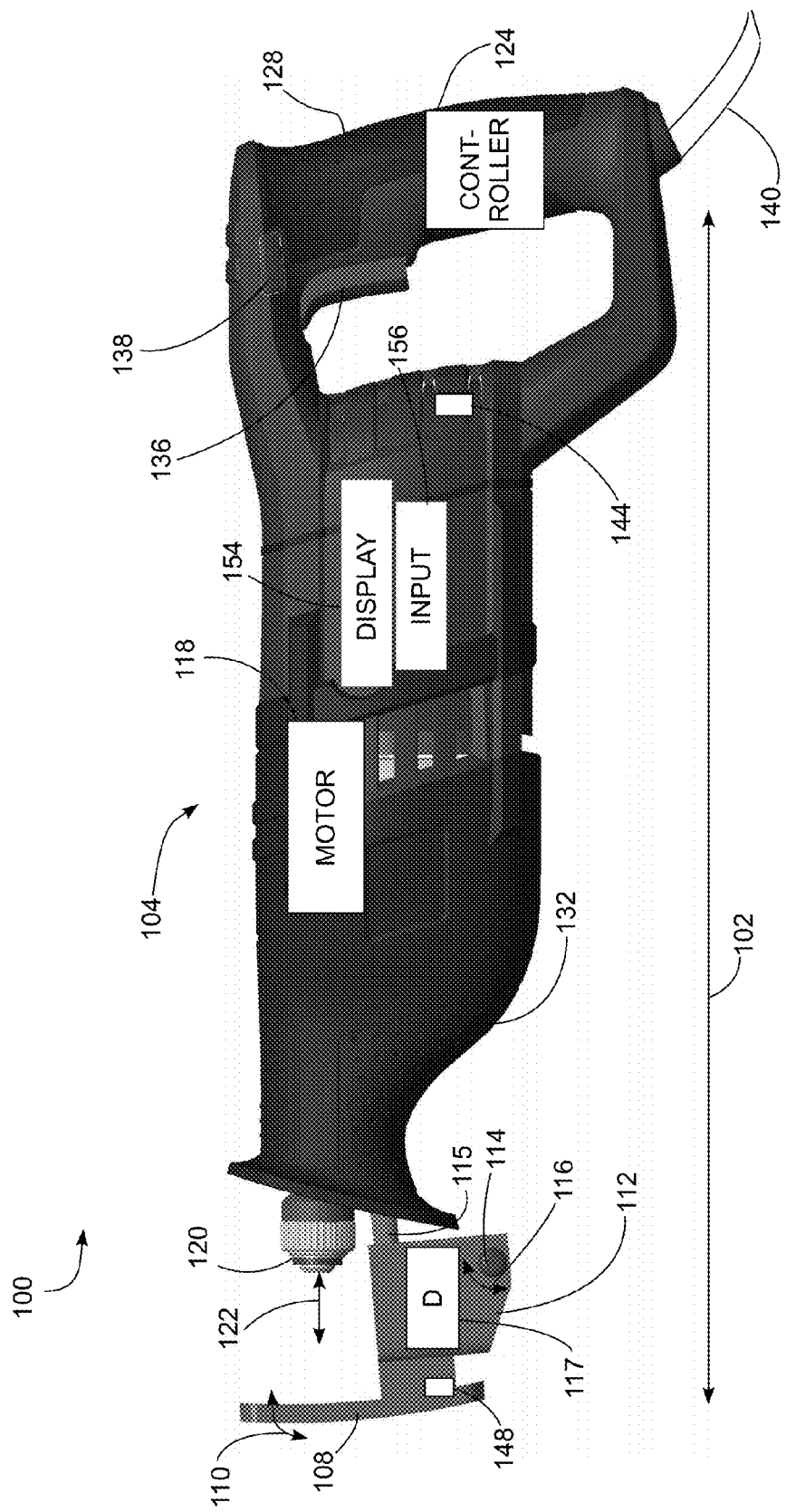
FIG. 1 is a side view of a handheld reciprocating saw including a semi-active vibrational dampener positioned outside of a saw housing.

For the purposes of promoting an understanding of the principles of the embodiments described herein, reference is now be made to the drawings and descriptions in the following written specification. No limitation to the scope of the subject matter is intended by the references. The present patent also includes any alterations and modifications to the illustrated embodiments and includes further applications of the principles of the described embodiments as would normally occur to one skilled in the art to which this patent pertains.

As used herein, the term "magnetorheological material" refers to a category of solid and liquid phase materials that exhibit a variable resistance to mechanical force when placed in a magnetic or electromagnetic field. The term "magnetorheological" is abbreviated as MR in the art, and is abbreviated as such herein. An MR material as used in this document means a non-electrically conductive material or fluid that includes magnetic particles, such as finely ground iron particles, which are suspended in the non-electrically conductive fluid or dispersed in an non-electrically conductive resilient material. The magnetic particles are distributed uniformly through the material to enable the magnetic particles to align in columnar or chain-like arrangements along the field lines of an electromagnetic field applied to the material or fluid in which the magnetic particles are dispersed. The viscosity of an MR fluid increases in the presence of the electromagnetic field, and increasing or decreasing the intensity of the electromagnetic field generates an increase and decrease, respectively, in the viscosity of the MR fluid. Solid phase MR materials include elastomers in which magnetic particles have been distributed. The MR elastomers have a low rigidity similar to a soft rubber in the absence of an electromagnetic field. The rigidity of the MR elastomer increases in the presence of an electromagnetic field, and the increase in rigidity of the MR elastomer varies in proportion to changes in the intensity of the electromagnetic field.

Another material suitable for use in semi-active vibrational dampeners is an electrorheological (ER) material, typically in the form of a fluid. In an ER material, electrically non-conductive particles suspended in an electrically non-conductive fluid align in the presence of an external electrostatic field that is applied to the ER material. The mechanical resistance of the ER material in the presence of the electrostatic field increases in a manner similar to the increase in mechanical resistance exhibited by MR material in the presence of an electromagnetic field. In one embodiment, ER material is placed between electrically charged plates that generate an electrostatic field and increase the mechanical resistance of the ER material. The MR materials and ER materials are both examples of a variable rheological material. As used herein, the term "variable rheological material" refers to any non-electrically conductive material or fluid in which non-electrically conductive particles in ER materials or magnetic particles in MR materials have been distributed to enable the mechanical resistance of the material to change in response to an electrostatic or an electromagnetic field.

As used herein, the term "jerk" refers to a change in a rate of acceleration of an object, including a housing of a power tool. Mathematically, a jerk is considered the derivative of an acceleration of the object. For example, just as acceleration refers to an instantaneous change in the velocity of an object at a given time, the jerk refers to an instantaneous change in the acceleration of the object at a given time. Acceleration is commonly measured in units of meters per second squared ($m/s^2$) and jerk is commonly measured in units of meters per second cubed ($m/s^3$). In one embodiment of a power tool that is configured to measure jerk, an electronic control device receives a series of acceleration measurements from one or more accelerometers over time, and the jerk is identified as the rate of change between the acceleration measurements.

FIG. 1 depicts a reciprocating saw 100 that includes a housing 104, footpad 108, and a movable member, depicted as a pivoting member 112, that includes a semi-active vibrational dampener 117 positioned in the pivoting member. The housing 100 holds a motor 118, controller 124, switch 136, switch safety 138, and an accelerometer 144. The rear portion of the housing 100 is formed as a handle 128 having a grip which is grasped by one hand of an operator during operation of the saw 100. A second grip 132 is formed on the housing and this grip is grasped by the second hand of the operator during operation. The housing 104, pivoting member 112, and footpad 108 of the saw 100 are arranged along a longitudinal axis 102.

Figure 2A:
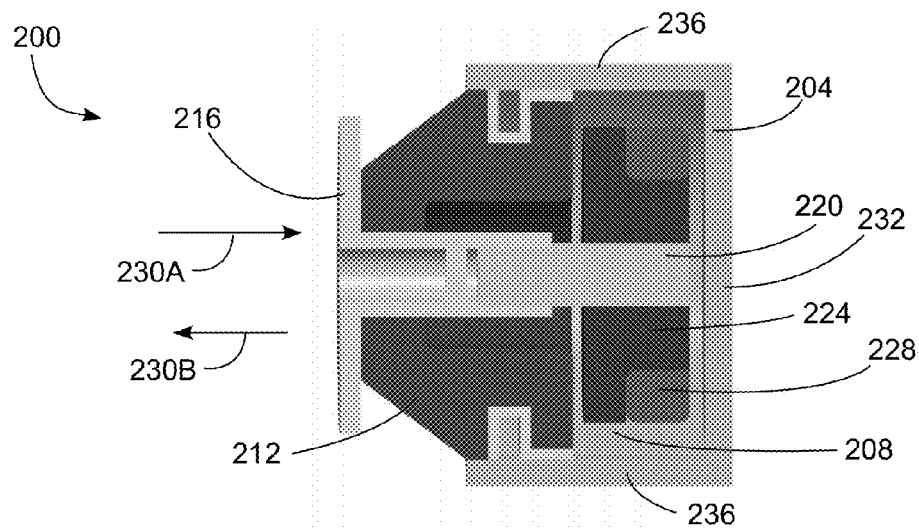
FIG. 2A is a cross-sectional view of a vibrational dampener that includes a magnetorheological liquid.
Figure 2B:
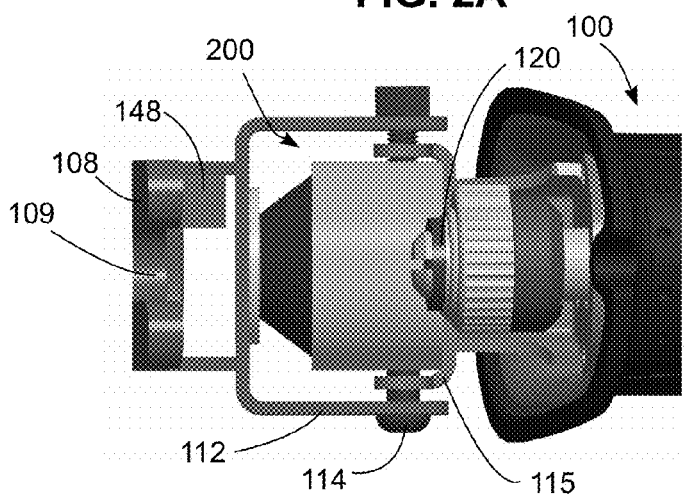
FIG. 2B is a top view of the vibrational dampener of FIG. 2A incorporated in the saw of FIG. 1.
Figure 2C:
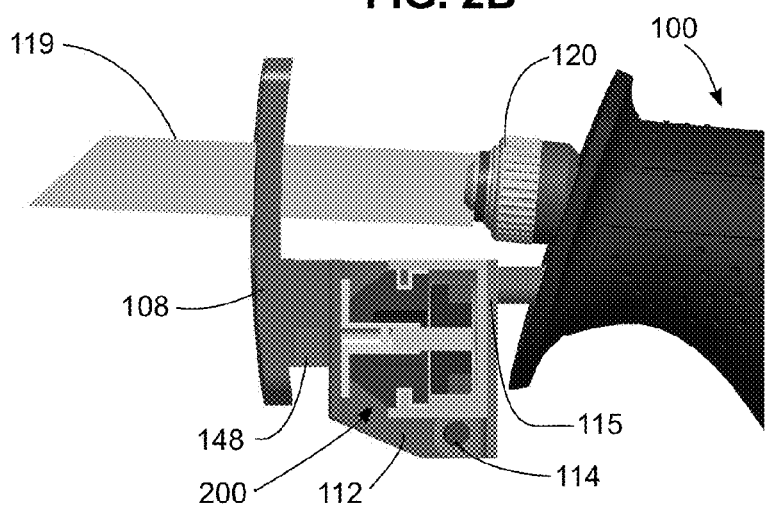
FIG. 2C is a partial cut-away view of the vibrational dampener of FIG. 2A incorporated in the saw of FIG. 1.
Figure 3A:
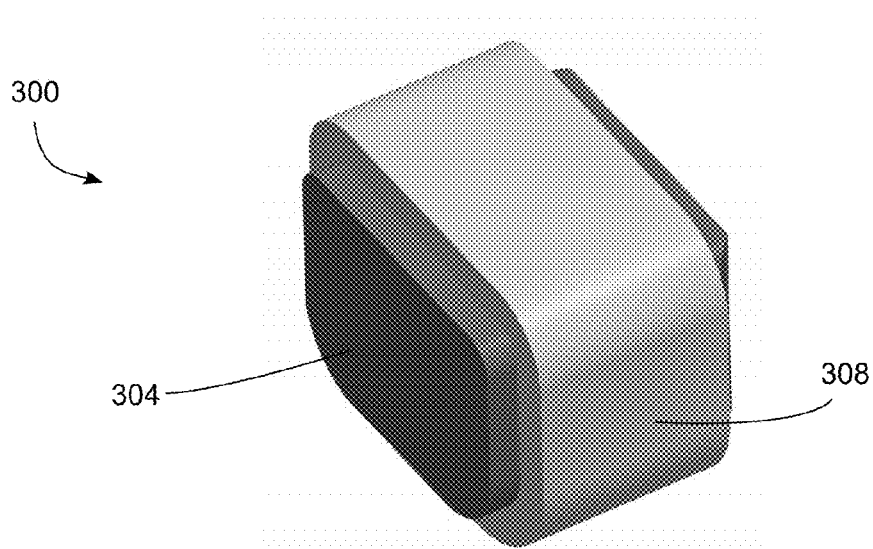
FIG. 3A is a perspective view of another vibrational dampener that includes a magnetorheological elastomer.
Figure 3B:
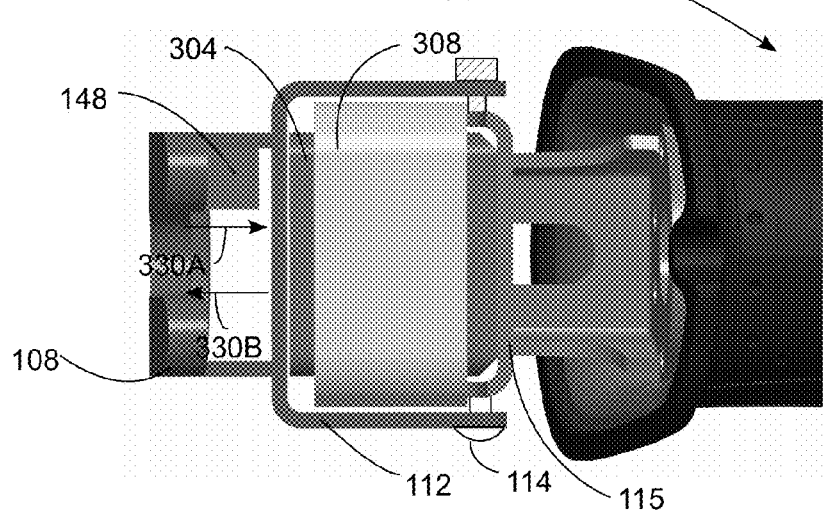
FIG. 3B is a top view of the vibrational dampener of FIG. 3A incorporated in the saw of FIG. 1.
Figure 3C:
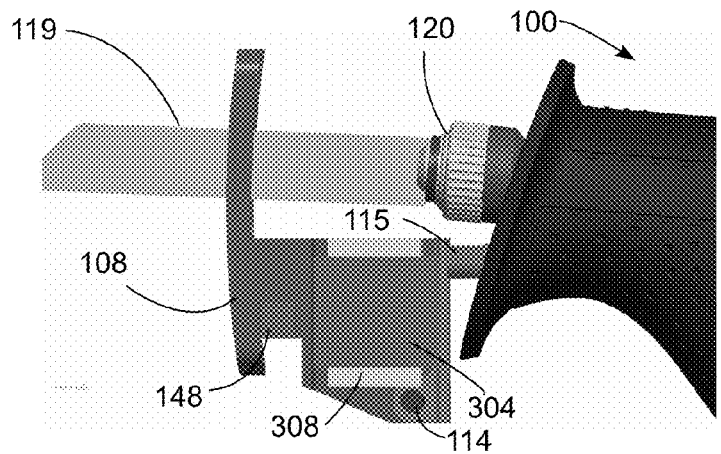
FIG. 3C is a partial cut-away view of the vibrational dampener of FIG. 2B incorporated in the saw of FIG. 1.

A saw-blade chuck 120 extends from the front of the housing 104 and is mechanically coupled to the motor 118. Prior to activating the saw 100, an operator positions a saw blade in the saw-blade chuck 120 and the saw-blade chuck 120 secures the saw blade in place. FIG. 2C and FIG. 3C depict an exemplary blade 119 engaged to the saw-blade chuck 120. When activated, the motor 118 drives the saw-blade chuck and the attached saw blade in a reciprocating motion as indicated by arrows 122. The reciprocating motion of the saw-blade chuck 120 and saw blade 119 are substantially parallel to the longitudinal axis 102 of the saw 100, although the motion of the saw blade in some reciprocating saws is placed at a predetermined angular offset from the longitudinal axis.

Various components in the saw 100, which include the motor 118, controller 124, and vibrational dampener 117, operate with an electrical current. In the saw 100, an electrical cord 140 extends from the handle 128 and receives electrical current from a standard electrical socket to supply the electrical current to the saw 100. In another configuration, the saw 100 holds a battery, fuel cell, or other electrical power supply to enable cordless operation.

The saw 100 is configured to cut a work piece, and the footpad 108 contacts the work piece during the cutting process. As depicted in FIG. 2B-FIG. 2C and FIG. 3B-FIG. 3C, the footpad 108 includes an opening 109 to enable the saw blade 119 to extend through the footpad 108 and to reciprocate during operation. An accelerometer 148 is positioned in the footpad 108 and generates signals corresponding to the movement of the footpad when the saw 100 is in operation. The footpad 108 is mechanically coupled to the housing 104 through the pivoting member 112.

During a cutting operation, footpad 108 moves in response to forces exerted on the footpad 108 from the work piece and from the housing 104. The footpad 108 receives random vibrational forces generated by the motion of the saw blade 119 and the work piece and by interaction of the footpad with the work piece during a cutting operation. The entire saw 100 experiences some movement back and forth along the longitudinal axis 102 during operation, and the footpad 108 also moves relative to the housing 104 as depicted by arrows 110. The footpad 108 transmits random vibrations generated from movement of the footpad in and out of contact with the work piece and random vibrations generated between the saw blade 119 and the work piece through the pivoting member 112 to the housing 104.

As depicted in FIG. 1, a pivoting member 112 is positioned in front of the housing 104. In the saw 100, the pivoting member is a metallic member that is configured in a roughly U-shaped form to contain the vibrational dampener 117. The pivoting member 112 engages an arm 115 extending out of the housing 104 at a pivot 114. The pivoting member rotates between a first position and a second position in direction 116 around the pivot 114 when the footpad 108 moves toward and away from the housing 104. In the first position, the pivoting member 112 rotates to place the footpad 108 at a maximum distance from the housing 104. During operation, forces applied to the footpad 108 move the footpad toward the housing 104 along the longitudinal axis 102, and the pivoting member 112 rotates toward the second position. As described in more detail below, the vibrational dampener positioned in the pivoting member 112 is fixedly engaged to the arm 115 on one side and engages the pivoting member 112 on another side. The semi-active vibrational dampener reduces a magnitude of vibrations that are transmitted from the footpad 108 through the pivoting member 112 to the saw housing 104. The semi-active vibrational dampener also biases the pivoting member 112 and the footpad 108 into the first position away from the housing 104 in the absence of a counteracting force that pushes the footpad 108 and housing 104 together.

While FIG. 1 depicts a pivoting member 112 positioned between the housing 104 and footpad 108, an alternative embodiment of the movable member moves linearly between a first position and a second position along the longitudinal axis 102. In one configuration, the movable member 112 slides on one or more rails that extend from the housing 104 between a first position and a second position as the footpad 108 moves toward the housing 104. The vibrational dampener 117 biases the movable member 112 to slide the movable member away from the housing 104 to the first position to return the footpad 108 to an extended position. In another configuration, a tube extends from the housing 104 and the movable member 112 slides in the tube between the first position and the second position. The semi-active vibrational dampener 117 dampens random vibrations that are transmitted from the footpad 108 to the housing 104 with each embodiment of the movable member 112.

In the embodiment of FIG. 1, the footpad 100 is fixedly attached to the pivoting member 112. In some embodiments, the footpad 108 and pivoting member 112 are formed as a single metallic piece. In the embodiment of FIG. 1, the footpad 108 moves toward and away from the housing 104 along arc 110 along with the pivoting member 112. FIG. 4A and FIG. 4B depict and alternative configuration with a footpad 408 that is movably engaged to a pivoting member 412. FIG. 4A depicts the footpad 408 in an extended position from the housing 104 and the footpad 408 moves in linear direction 410A approximately parallel to the longitudinal axis toward the housing 104. As the footpad 408 moves in direction 410A, the pivoting member 412 pivots around the pivot 114. A second pivot 414 joins the footpad 408 to the pivoting member 412, and the footpad 408 moves in a linear motion instead of rotating in the manner of footpad 108. FIG. 4B depicts the pivoting member 412 in a compressed configuration, and the footpad 408 is configured to return to the extended position in linear direction 410B. Both of the footpad and pivoting member embodiments include a vibrational dampener in the pivoting member that is selectively activated to dampen vibrations transmitted from the foot member to the housing.

Various embodiments of semi-active vibrational dampeners are configured for use with the saw 100. One embodiment of the semi-active vibrational dampener 117 depicted in FIG. 2A-FIG. 2C is a semi-active vibrational dampener 200 that includes an MR fluid. FIG. 2A depicts a cross-sectional view of the vibrational dampener 200 that includes a dampener housing 204 having a fluid chamber 208, elastomer bellow 212, pressure plate 216, bobbin shaft 220, bobbin 224, and electrically conductive coil 228. In the dampener 200, the elastomer bellow 212 forms a seal across an open side of the dampener housing 204 and an MR fluid fills the fluid chamber 208.

In operation, pressure applied to the pressure plate 216 compresses the elastomeric bellow 212 and moves the bobbin 224 in direction 230A. While the elastomeric bellow 212 and bobbin 224 compress when the pivoting member 112 moves towards the housing 104, many embodiments of the MR fluid are substantially incompressible, and the MR fluid displaces within the dampener housing 204 as the bobbin 224 moves. The vibrational dampener 200 is positioned outside of the housing 104 and is configured to hold a larger volume of MR fluid than vibrational dampeners positioned within the housing. In the embodiment of FIG. 2A-2C, the fluid chamber 208 is configured to hold approximately 10 to 15 cubic centimeters of the MR fluid. The MR fluid and the elastomeric bellow 212 exert a force against the pressure plate in direction 230B to counteract the compression of the bobbin 224. An electric current flows through the electrical conductor selectively to form an electromagnetic field with the dampener housing 204 around the MR fluid in the fluid chamber 208. When activated, magnetic particles that are suspended in the MR fluid align in a column-like arrangement following field lines of the electromagnetic field. The arrangement of the magnetic particles in the MR fluid increases the viscosity of the MR fluid and resistance to the movement of the bobbin 224 within the fluid.

During operation, the bobbin 224 fixedly engages the footpad 108. In some embodiments, the combined mass of the footpad 108, pressure plate 216, and bobbin 224 is approximately 115 grams. The combined mass is selected to increase the dampening of vibrations transmitted from the work piece to the housing 104 while also being light enough to enable the operator to hold and operate the saw 100. As described in more detail below, saw configurations that provide additional mass to the footpad 108, pressure plate 216, and bobbin 224 increase the base mass in a sprung mass system and improve the vibrational dampening characteristics of a vibrational dampener.

The semi-active vibrational dampener 200 is located in the pivoting member 112 with a wall of the dampener housing 204 engaged to the housing via the arm 115. The pressure plate 216 contacts the pivoting member 112. The pivoting member 112 transmits vibrations from the footpad 108 to the pressure plate 216 and the dampener 200. As described in more detail below, the controller 124 is configured to selectively activate and deactivate the electromagnetic field in the dampener 200 to dampen the vibrations from the pivoting member and to reduce the magnitude of vibrations transmitted to the housing 104.

In another embodiment, the vibrational dampener 117 includes an MR elastomer. FIG. 3A-FIG. 3C depict a semi-active vibrational dampener 300 that includes the MR elastomer. The vibrational dampener 300 includes a block of MR elastomer 304 that is surrounded by an electrically conductive coil 308. The MR elastomer block 304 is shaped to fill the volume of the pivoting member 112 and one side of the MR block 304 engages the arm 115 of the housing 104 and a second side of the MR block 304 engages the pivoting member 112. The position of the MR elastomer block 304 outside of the body 104 in the saw 100 enables the MR elastomer block to have a larger volume than vibrational dampeners that are positioned within the housing. In the embodiment of FIG. 3A-3C, the MR elastomer block has a volume of approximately 39 cubic centimeters.

During operation, the pivoting member 112 transmits vibrations from the footpad 108 to the MR elastomer 304. The pivoting member 112 moves in direction 330 and deforms the MR elastomer 304 when the footpad 108 moves toward the housing 104. The MR elastomer 304 deforms in response to the compressive force of the pivoting member 112 and exerts a force on the pivoting member 112 in direction 330B to counteract the movement of the pivoting member 112. When an electric current flows through the coil 308, the coil 308 and pivoting member 112 form an electromagnetic field around the MR elastomer 304. Magnetic particles distributed through the MR elastomer 304 align with field lines of the electromagnetic filed and increase the rigidity of the MR elastomer 304. As described in more detail below, the controller 124 is configured to selectively activate and deactivate the electromagnetic field in the dampener 300 to dampen the vibrations from the pivoting member and to reduce the magnitude of vibrations transmitted to the housing 104.

The semi-active vibrational dampeners 200 and 300 are suitable for use in the saw 100 as the vibrational dampener 117. While the vibrational dampeners 200 and 300 include a form of a magnetorheological material, similar vibrational dampeners include another variable rheological material such as an ER fluid. One of the vibrational dampeners is positioned in the pivoting member 112 outside of the housing 104. The position of the vibrational dampener 117 outside of the housing 104 enables the vibrational dampener 117 to reduce vibrations experienced by both hands of an operator who grips the saw 100 at the handle 128 and hand grip 132. The volume of the pivoting member 112 enables the vibrational dampener to hold a larger volume of variable rheological material than vibrational dampeners that are positioned within a housing or handle of a handheld tool. Vibrational dampeners with larger volumes of variable rheological material are more effective at dampening lower frequency vibrations that reach the operator through the housing. In the example of FIG. 1, the pivoting member 112 provides a volume of 95 cubic centimeters to accommodate the vibrational dampener 117. The vibrational dampener 117 provides dampening for random vibrations in a frequency range of between 1 Hz and 250 Hz.

The position of the vibrational dampener 117 in the pivoting member 112 also isolates the vibrational dampener 117 from excess heat and electromagnetic fields present in the housing 104. During operation, the vibrational dampener 117 absorbs energy while dampening vibrations and the absorbed energy generates heat in the vibrational dampener 117. The vibrational dampener 117 radiates the heat through the externally positioned pivoting member 112 more quickly than dampeners that are positioned within the housing 100. Additionally, the vibrational dampener is isolated from heat sources such as the motor 118 within the housing 104. Thus, the variable rheological materials in the vibrational dampeners 200 and 300 operate with a lower range of temperatures than variable rheological materials positioned inside the housing. Further, since the mechanical resistance of variable rheological materials changes in response to electromagnetic fields or electrical fields, the external position of the vibrational dampener also isolates the variable rheological material from electrical and electromagnetic fields generated by the electric motor 118 and other components within the housing 104.

Referring again to FIG. 1, the saw 100 is configured with a controller 124 that controls an electromagnetic field generated in the semi-active vibrational dampener. Controller 124 selectively operates switches to control the electrical current delivered to the coil for the generation of the electromagnetic field in the semi-active dampener. This switch control varies the level of mechanical resistance exerted against movement of the footpad 108 and pivoting member 112. Controller 124 is operatively connected to the housing accelerometer 144, footpad accelerometer 148 and the vibrational dampener. In one embodiment, an analogue control circuit implements the function of the controller 124. In another embodiment, the controller 124 includes a digital microcontroller or microprocessor and the controller executes programmed instructions stored in a memory to control the operation of the vibrational dampener. The controller 124 stores data received from the accelerometers 144 and 148 in the memory including data corresponding to the amplitude, frequency, and duration of vibrational forces detected in the saw 100. In some configurations, the controller 124 also controls the operation of other components in the saw 100 such as the motor 118. The controller 124 is positioned in the handle 128 of the saw 100, but in an alternative configuration, the controller 124 is positioned farther forward in the housing 104.

In some embodiments, the controller 124 is operatively connected to a display 154 and input device 156. Various forms of display include one or more lights that illuminate under various conditions, and alphanumeric or graphical displays such as a liquid crystal display (LCD). The input device 156 includes switches, a touchscreen, buttons, dials, or any other suitable device that enable the operator to input information into the saw 100. In particular, the display 154 displays information corresponding to an accumulated amount of vibration that the operator has experienced while operating the saw.

In operation, an operator holds the saw 100 in both hands, with one hand gripping the handle 128 and another hand holding the housing around grip 132. The operator disengages the switch safety 138 and squeezes the switch 136 to activate the reciprocating motor 118. The motor 118 reciprocates the blade chuck 120 and saw blade 119 to cut a work piece that engages the footpad 108. As the saw 100 cuts the work piece, random vibrations are transmitted to the housing through the footpad 108 and through the saw blade 119. The controller 124 identifies a relative acceleration of the housing 104 with reference to the housing accelerometer 144 along the longitudinal axis 102 and a relative acceleration of the footpad 108 with reference to the footpad accelerometer 148 along the longitudinal axis 102. The controller selectively activates and deactivates an electric current to generate an electromagnetic field formed around an MR material or an electrostatic field around an ER material in the vibrational dampener 117 to dampen random vibrations that are transmitted through the housing 100 to both hands of the operator.

Figure 10:
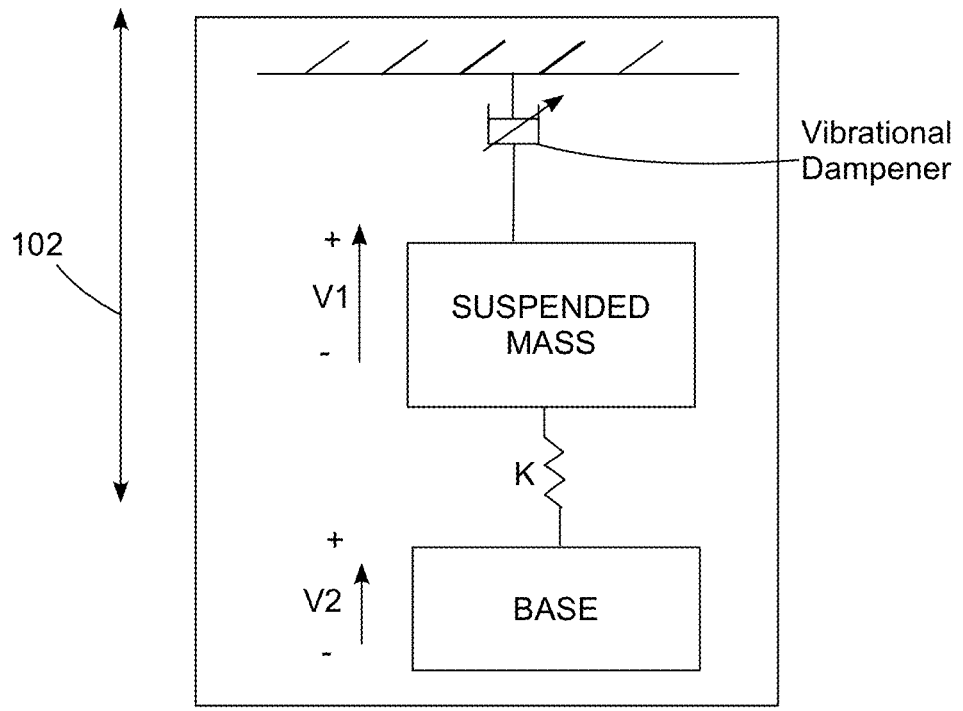
FIG. 10 is a schematic diagram of a suspended mass and a base in a prior art skyhook control system.

During operation of the saw, the controller 124 selectively activates and deactivates the electromagnetic field in the semi-active dampener 117 with reference to the relative motion between the footpad 108 and the housing 104. In some embodiments, the controller 124 implements a type of control protocol referred to as a "skyhook" control for the dampener 117. In an ideal previously known skyhook, depicted in FIG. 10, a suspended mass hangs from a vibrational dampener that is considered to be hooked to the sky, i.e., anchored to a point in the sky without need of additional support. A spring with spring constant K attaches the suspended mass to a base. In the saw 100, the housing 104 forms the suspended mass and the footpad 108 forms the base. A skyhook control system selects a dampening coefficient of the vibrational dampener that minimizes the vibrational effects of excitations in the base on the suspended mass. In vibrational dampening systems including the skyhook control system, the mass of the base is one factor in dampening the vibrations experienced in the suspended mass. As described above, the mass of the footpad 108 and the section of the vibrational dampener 117 that affixes to the footpad 108 contribute to the mass of the base. In general, a base with larger mass dampens vibrations in the suspended mass (housing 104) to a larger degree. The mass of the footpad 108 is selected to increase the dampening of vibrations in the housing 104 while also having a mass that is low enough to enable the operator to hold and operate the saw 100. One advantage of vibrational dampeners that implement a skyhook control system is that the skyhook control reduces or eliminates sympathetic vibrations that occur when the vibrational dampeners experience vibrations having frequencies at or near the natural resonant frequency of the vibrational dampener. Alternative embodiments use various control techniques including acceleration driven dampening (ADD).

Figure 11:
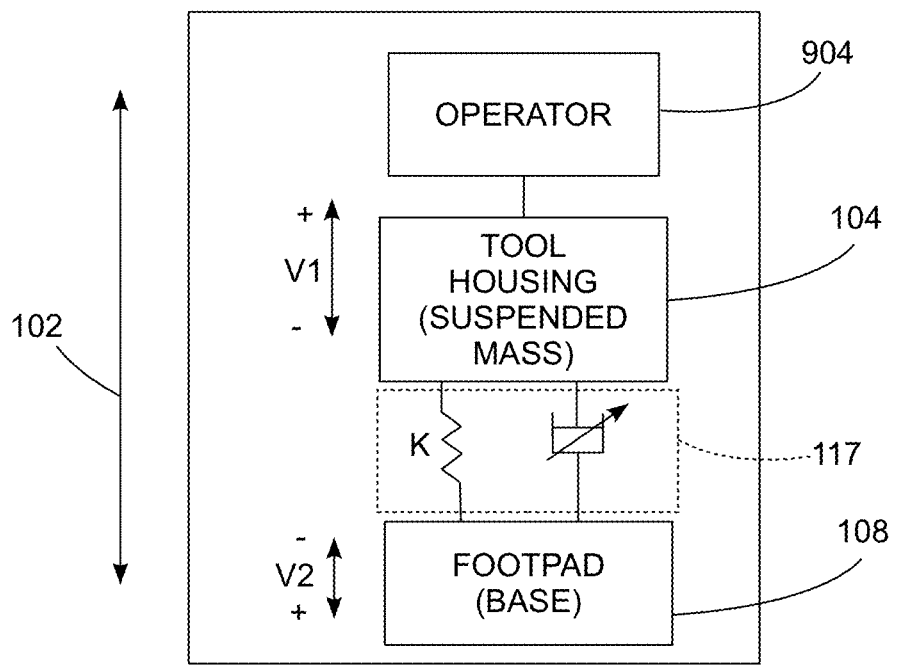
FIG. 11 is a schematic diagram of a housing and footpad in the saw of FIG. 1 configured with a controllable damper positioned between the housing and footpad.

FIG. 11 depicts a configuration of the suspended mass and base as embodied in the saw 100. The housing 104 forms the suspended mass and the footpad 108 forms the base. In FIG. 11, the model of the vibrational dampener 117 includes both a spring with spring constant K and a dampener with a variable dampening coefficient. In the saw 100, the controller 124 selectively adjusts the mechanical resistance and vibrational dampening coefficient of the vibrational dampener 117 to reduce the effect of vibrations generated in the base (footpad 108) on the suspended mass (housing 104). An operator 904 holds the housing 104 with two hands and vibrational dampener 117 reduces the vibrations experienced by the operator 904 from the housing 104. The processes described herein describe variations of the skyhook control system, but various embodiments of the controller 124 implement other control systems that enable the vibrational dampener 117 to dampen low-frequency random vibrations that are transmitted from the footpad 108 to the housing 104.

Figure 5:
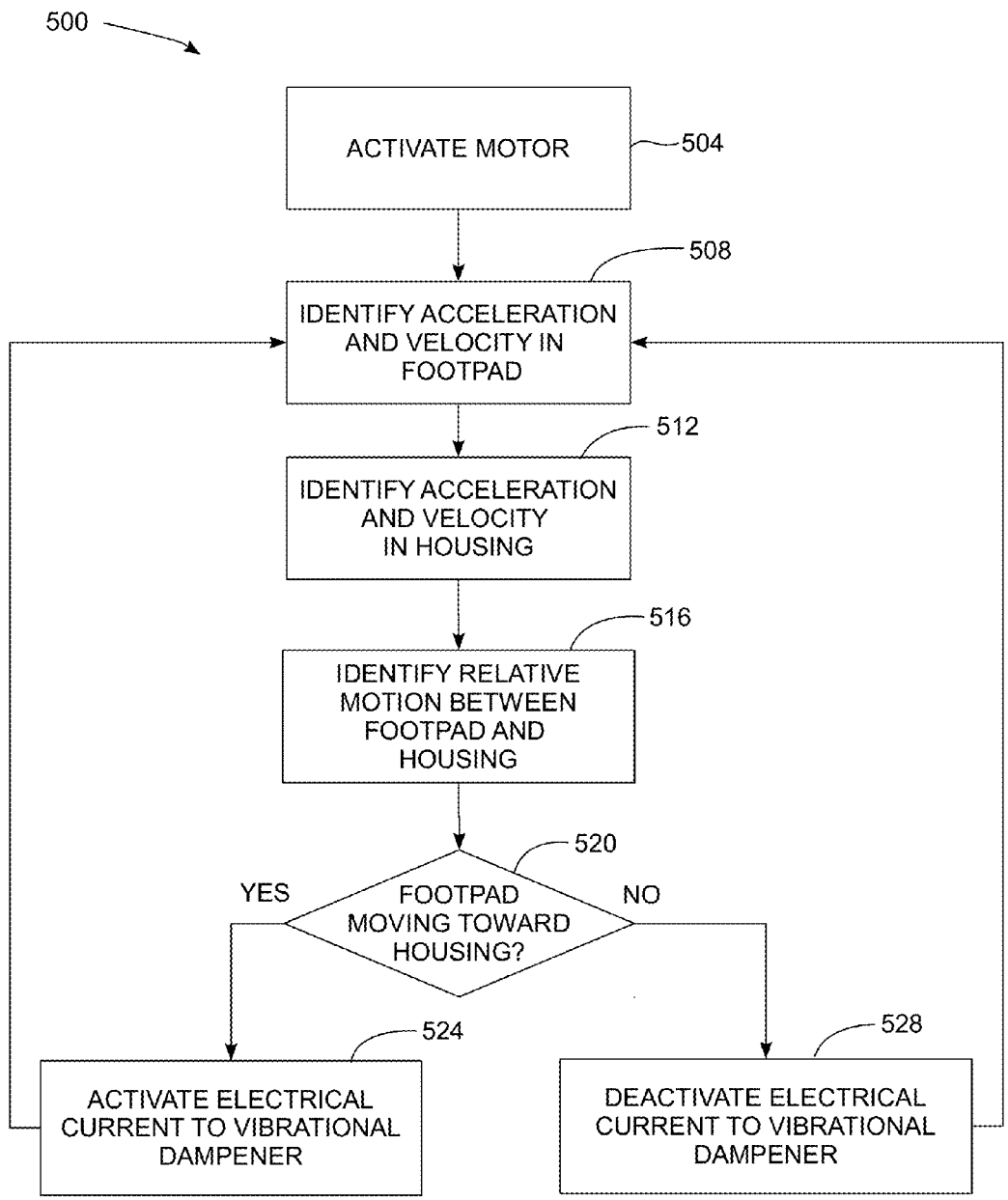
FIG. 5 is a block diagram of a process for operating a semi-active vibrational dampener in a handheld power tool.

FIG. 5 depicts a process 500 for operating a semi-active vibrational dampener in a handheld power tool to dampen vibrations transmitted to the hands of an operator who holds the tool. Process 500 is described with reference to the saw 100 in FIG. 1 for illustrative purposes. Process 500 begins when the motor in the handheld tool activates (block 504). In the saw 100, the operator disengages the switch safety 138 and squeezes the switch to activate the motor 118. The motor 118 drives the saw-blade chuck 120 and the saw blade in a reciprocating motion. The footpad 108 engages a work piece and the saw blade cuts the work piece.

During operation with the saw 100, both the housing 104 and footpad 108 experience acceleration due to vibration. In the saw 100, the controller 124 identifies acceleration of the footpad 108 with reference to signals generated by the footpad accelerometer 148 (block 508). Various embodiments of the footpad accelerometer 148 include single axis and multi-axis accelerometers that generate signals corresponding to acceleration in one or more directions. The controller 124 is configured to integrate multiple acceleration signals corresponding to the acceleration of the footpad 108 along the longitudinal axis 102 to identify a relative linear velocity of the footpad 108 along the longitudinal access 102. The controller 124 also identifies an acceleration and relative velocity of the housing 104 along the longitudinal axis 102 with reference to the signals generated by the housing accelerometer 144 (block 512). In some embodiments, the controller 124 applies one or more filters to the signals received from the housing accelerometer 144 and footpad accelerometer 148 to remove a direct current (DC) offset from the accelerometer signals and to remove high-frequency noise from the accelerometer signals. The controller 124 can implement various filters, including low-pass filters and washout filters, to filter the signals from the accelerometers 144 and 148.

As described above, the vibrational dampener 117 can be configured to dampen low-frequency vibrations with frequencies of less than 250 Hz. The controller 124 may include a low-pass filter applied to signals from the housing accelerometer 140 and footpad accelerometer 148. The filtered acceleration signals enable the controller 124 to identify relative motion of the housing 104 and footpad 108 that are generated by the low-frequency vibrations.

After identifying the velocities of the footpad 108 and the housing 104 along the longitudinal axis 102, process 500 identifies the relative motion between the housing 104 and footpad 108 (block 516). In the saw 100, controller 124 compares the velocity of the footpad 108 along the longitudinal axis 102 to the velocity of the housing 104. The controller also identifies a relative motion between the housing 104 and footpad 108 with reference to both velocities. The identified relative motion indicates if the housing 104 and footpad 108 are moving toward each other or away from each other, and indicates the velocity of the relative motion.

Process 500 continues by adjusting the electrical current applied to the vibrational dampener based on the identified relative motion of the housing 104 and footpad 108. If the housing 104 and footpad 108 are moving closer together, then controller 124 activates the electrical current supplied to the vibrational dampener 117 (block 524). The electrical current generates an electromagnetic field in the vibrational dampener 117 and the mechanical resistance of the variable rheological material in the vibrational dampener 117 increases in the presence of an electromagnetic or electrostatic field. When the housing 104 and footpad 108 move closer together, the pivoting member 112 transmits a force into the vibrational dampener 117. The variable rheological material in the vibrational dampener resists the force transmitted from the pivoting member 112.

If the housing 104 and footpad 108 are moving apart, then controller 124 deactivates the electrical current supplied to the vibrational dampener 117 (block 528). In the absence of the electric current, the mechanical resistance of the variable rheological material in the vibrational dampener 117 drops to the natural mechanical resistance of the variable rheological fluid or elastomer when no electromagnetic field is applied to the variable rheological material. The vibrational dampener 117 applies a reduced mechanical resistance to the movement of the pivoting member 112 when the pivoting member 112 rotates away from the housing 104 and the variable rheological material in the vibrational dampener 117 returns to an undeformed configuration.

Process 500 repeats blocks 508-528 as the saw 100 cuts the work piece. In one embodiment process 500 identifies the relative motion of the housing 104 and footpad 108 and adjusts the electromagnetic field in the vibrational dampener at up to 250 times per second. The semi-active vibrational dampener 117 dampens random vibration by selectively increasing the resistance to compression and decreasing resistance to decompression between the housing 104 and footpad 108. In one embodiment of process 500, the electrical current applied to the vibrational dampener 117 is either applied at a maximum level or completely deactivated in an on-off control arrangement. In another embodiment of process 500, the controller 124 applies an electrical current to the vibrational dampener 117 that is proportional to the relative velocity of the housing 104 and footpad 108 when the housing 104 and footpad 108 are moving toward each other. The corresponding mechanical resistance of the variable rheological material in the vibrational dampener 117 increases in proportion to the intensity of the electromagnetic field to enable the vibrational dampener 117 to exhibit a mechanical resistance that is proportional to the velocity of the compressing housing 104 and footpad 108.

Figure 6:
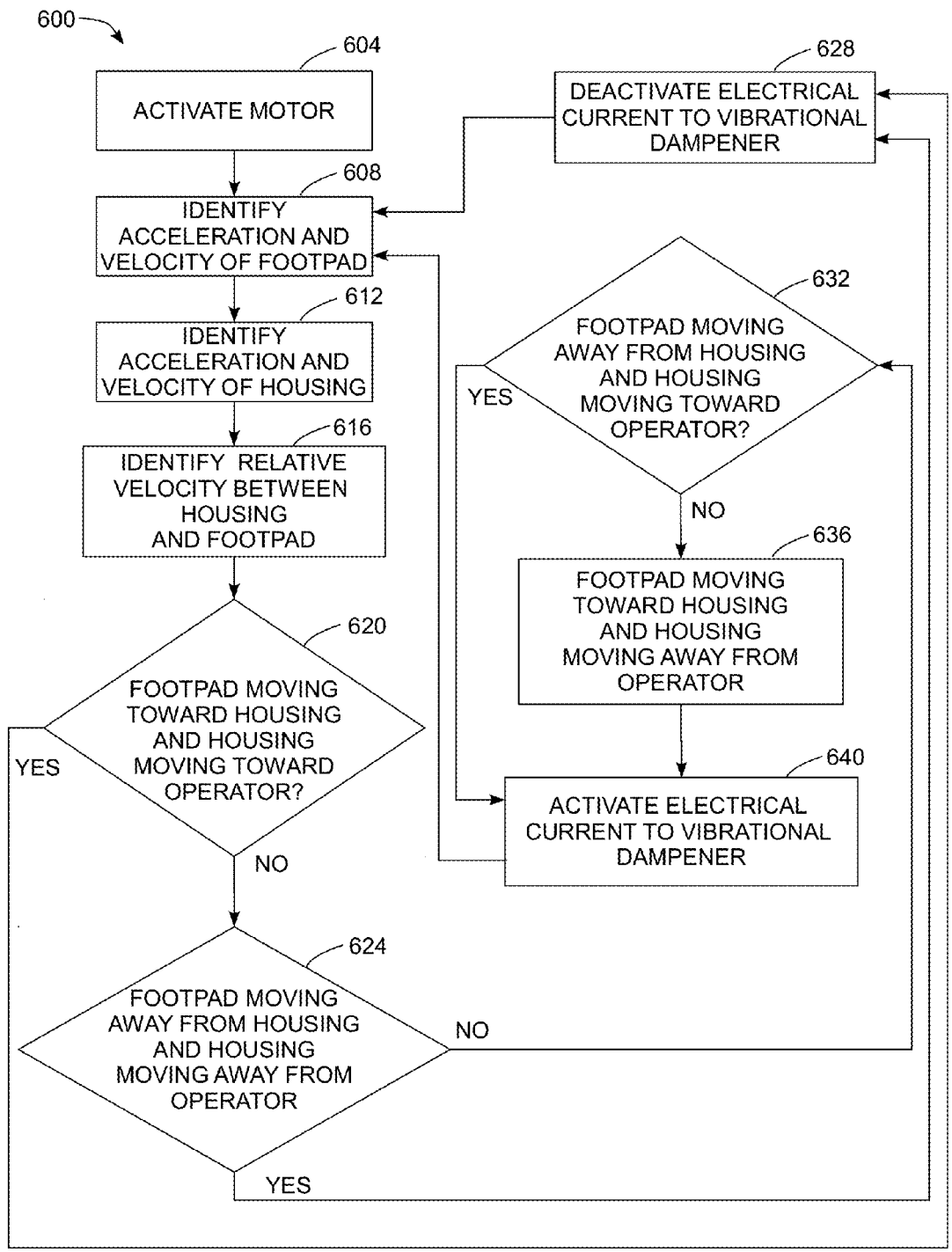
FIG. 6 is a block diagram of another process for operating a semi-active vibrational dampener in a handheld power tool.

FIG. 6 depicts an alternative process 600 for controlling a semi-active vibrational dampener in a handheld power tool such as the saw 100 using a skyhook control method. Process 600 is described with reference to the saw 100 in FIG. 1 for illustrative purposes. Process 600 begins by activating the motor in the handheld tool (block 604), and identifying the acceleration and relative velocity of the footpad (block 608) and housing (block 612). The controller 124 performs the processing described in blocks 604-612 in substantially the same manner as the processing described in blocks 504-512, respectively, of process 500.

In process 600, the controller 124 identifies the relative velocities of both the housing 104 and footpad 108 along the longitudinal axis 102 with respect to the position of the operator holding the saw 100 (block 616). In one arrangement, the velocity $V_1$ of the housing 104 has a positive value when moving toward the operator, and a negative value when moving away from the operator along the longitudinal axis 102. The relative velocity $V_{12}$ between the housing 104 and footpad 108 has a positive value when the housing 104 and footpad 108 move away from each other, and a negative value when the housing 104 and footpad 108 move toward each other along the longitudinal axis 102.

In process 600, the following equation identifies the electrical force to apply to the vibrational dampener:

$$\begin{cases} V_1 V_{12} > 0 & \text{Activate Electrical Current} \\ V_1 V_{12} < 0 & \text{Deactivate } Electricla \text{ Current} \end{cases}.$$

The controller 124 identifies a condition where the housing moves toward the operator and the footpad moves toward the housing (block 620) or a condition where the footpad moves away from the housing and the housing moves away from the operator (block 624). In either condition the product of $V_1 V_{12}$ is negative, and the controller 124 deactivates the electrical current supplied to the vibrational dampener 117 (block 628). More intuitively, in either condition of block 620 or 624, the variable rheological material in the semi-active dampener 117 has a lowered mechanical resistance to promote isolation of the forces in the footpad 108 from being transmitted to the housing 104 in situations where the forces in the footpad 108 would increase the vibrational force in the housing 104. The reduced mechanical resistance of the variable rheological material when the electromagnetic field is deactivated attenuates the transmission of vibration from the footpad 108 to the housing 104.

When the housing 104 and footpad 108 are moving apart from each other and the housing 104 is moving toward the operator (block 632) and when the housing 104 and footpad 108 move toward each other while the housing 104 moves away from the operator (block 636), the product of $V_1 V_{12}$ is positive. The controller 124 activates the electrical current to the vibrational dampener 117 (block 640). More intuitively, the electrical current activates to increase the mechanical resistance of the variable rheological material in the vibrational dampener 117 when the movement of the footpad 108 can be used to dampen vibrations in the housing 104. The increased mechanical resistance of the variable rheological material enables some of the vibrational force in the housing 104 to be transmitted to the footpad 108 instead of being transmitted to the operator through the handle 128 and hand grip 132. In one embodiment, the controller 124 either activates or deactivates the electrical current supplied to the vibrational dampener 117 using an on-off control scheme. In other embodiments, the controller 124 activates the electrical current with a value that is proportional to the magnitude of $V_1V_{12}$.

In an alternative saw embodiment, process 600 identifies the relative velocity and movement of the housing 104 and footpad 108 using only the housing accelerometer 144 and omitting the footpad accelerometer 148. The controller 124 identifies the velocity of the housing 104 as described above, and generates a measurement of the velocity $V_2$ of the footpad 108 using the following equation:

$$V_{12} = \frac{\beta}{s+\alpha}\left(\frac{1}{s}V_1'\right)$$

where s is the complex variable ($\sigma+j\omega$) from the well-known Laplace transform, $V_1'$ is the measured acceleration of the housing, and $\alpha$ and $\beta$ are constant values identified with characteristics of the saw 100. The $\alpha$ constant is defined as $$\alpha = \frac{K}{C_{mean}}$$

where K is the spring constant of the vibrational dampener 117 and $C_{mean}$ is a mean dampening coefficient of the dampener 117. The $\beta$ constant is defined as $$\beta = \frac{m_{min} + m_{max}}{C_{mean}}$$

where $m_{min}$ and $m_{max}$ are minimum and maximum masses of the housing 104. Since the mass of the housing 104 in the saw 100 does not vary substantially during operation, $\beta$ can also be defined as $$\beta = \frac{m_{housing}}{C_{mean}}.$$

Process 600 then uses the identified values for $V_1$ and $V_{12}$, with a proportional skyhook control law:

$$C_{skyhook} = \begin{cases} GV_1V_{12} & V_1V_{12} \geq 0 \\ 0 & V_1V_{12} < 0 \end{cases}$$

The term G refers to a predetermined gain constant. In alternative configurations, the controller 124 activates the vibrational dampener 117 with a maximum electrical current if $V_1V_{12} \geq 0$. Process 500 can also be modified to identify $V_{12}$ using a single accelerometer 144 in the housing 104.

Another type of control system that is similar to a skyhook control is an acceleration driven dampener (ADD) control. One form of an ADD control operates the semi-active vibrational dampener with reference to the acceleration $V_1'$ of the suspended mass 104 and the relative velocity of the base and suspended mass using the following equation:

$$\begin{cases} V_1'V_{12} > 0 & \text{Activate Electrical Current} \\ V_1'V_{12} < 0 & \text{Deactivate Electricla Current} \end{cases}.$$

Thus, the ADD control is similar to the skyhook control with the suspended mass acceleration $V_1'$ replacing the suspended mass velocity $V_1$ used in the skyhook control. In saw 100 the suspended mass is the housing 104 and the base is the footpad 108. In process 600, the controller 124 identifies the acceleration of the housing 104 (block 612) and the relative velocity of the housing 104 and footpad 108 (block 616). The controller 124 can be configured to implement the ADD control system using process 600 with reference to the acceleration $V_1'$ of the housing 104 instead of the velocity of the housing 104. The ADD control is effective at dampening vibrations that at or beyond a first natural harmonic frequency of the semi-active vibrational dampener 117. Numerous variations of skyhook controls and ADD controls are known in the art and the saw 100 can be configured to use variations on each of the skyhook and ADD controls that are known to the art beyond the examples described herein.

Figure 7:
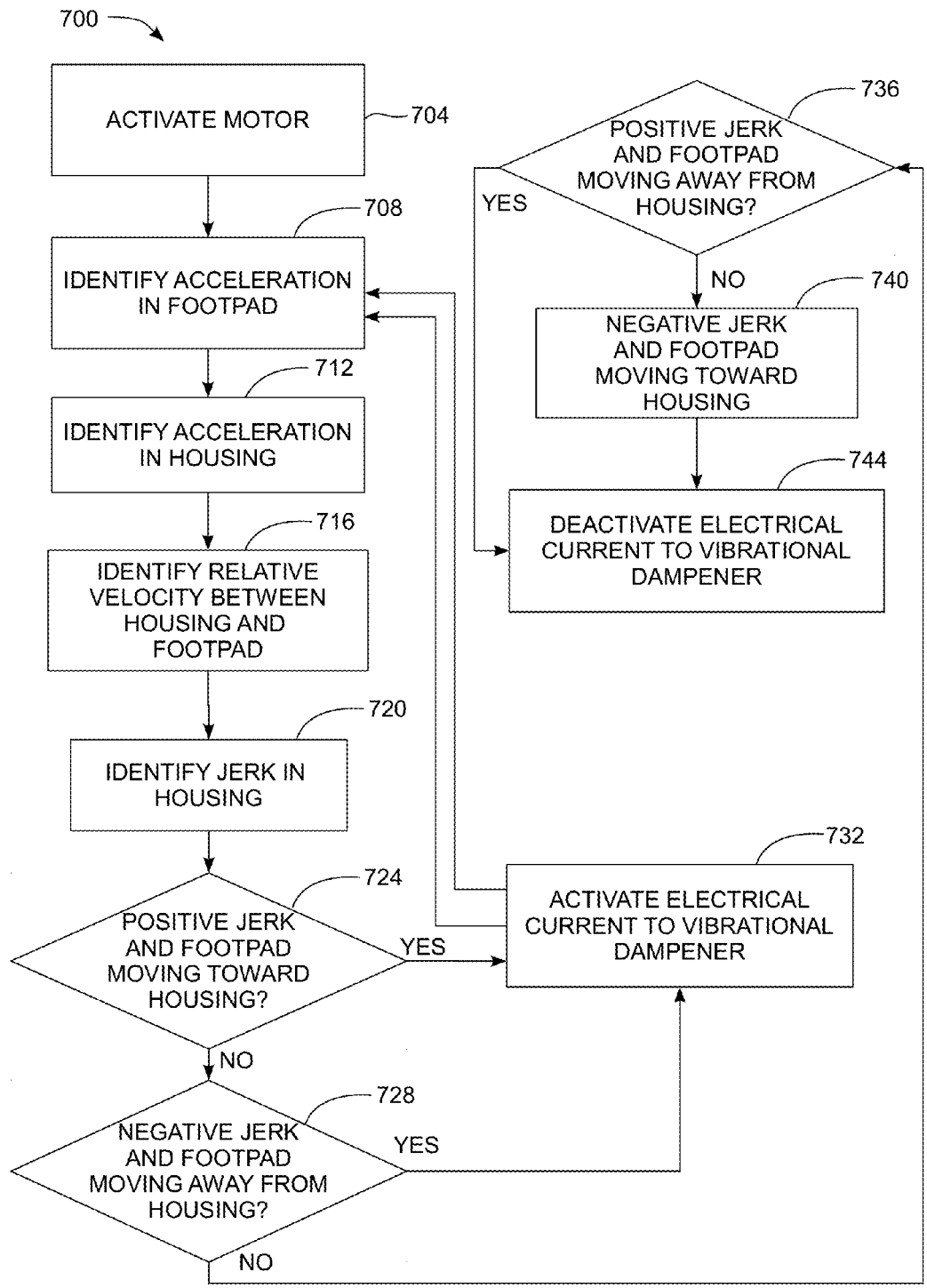
FIG. 7 is a block diagram of another process for operating a semi-active vibrational dampener in a handheld power tool.

FIG. 7 depicts another process 700 for controlling a vibrational dampener in handheld tool. Process 700 is a modification of the skyhook control depicted in process 600. Process 700 is described with reference to the saw 100 in FIG. 1 for illustrative purposes. Process 700 begins by activating the motor in the handheld tool (block 704), identifying the acceleration and relative velocity of the footpad (block 708) and housing (block 712), and identifying the relative velocity of between the housing 104 and the footpad 108 (block 716). The controller 124 performs the processing described in blocks 704-716 in substantially the same manner as blocks 604-616, respectively, from process 600.

Process 700 identifies a jerk experienced by the housing 104 using the housing accelerometer 144 (block 720). In the saw 100, the controller 124 receives multiple acceleration measurements from the housing accelerometer 144 as the saw 100 cuts a work piece. The controller 124 identifies the jerk as the rate of change of the acceleration measurements over time. For example, if the housing accelerometer 144 generates 1000 acceleration measurements per second, the controller 124 estimates the jerk experienced in the housing along the longitudinal axis 102 using two or more previous acceleration measurements. In one embodiment, the controller 124 fits a linear curve or a spline to the acceleration measurements to estimate the rate of change of the acceleration and generate a value of the jerk. A positive jerk value indicates that the rate of acceleration is increasing on the longitudinal axis 102 and a negative jerk value indicates that the rate of acceleration is decreasing on the longitudinal axis 102.

In process 700, the relative motion between the housing 104 and footpad 108 is referred to as $V_{12}$ where positive values of $V_{12}$ indicate that the housing 104 and footpad 108 are moving away from each other, and negative values indicate that the housing 104 and footpad 108 are moving toward each other along the longitudinal axis 102. The identified jerk of the housing is referred to as $J_H$. The following equation identifies the electrical force to apply to the vibrational dampener:

$$\begin{cases} J_HV_{12} \leq 0 & \text{Activate Electrical Current} \\ J_HV_{12} > 0 & \text{Deactivate Electricla Current} \end{cases}.$$

Controller 124 identifies when the housing 104 and footpad 108 are moving closer together and the jerk in the housing is positive (block 724) and when the housing 104 and footpad 108 are moving away from each other and the jerk in the housing is negative (block 728). The controller 124 activates the electrical current to generated the electromagnetic field in the vibrational dampener in either case (block 732). Controller 124 further identifies when the jerk in the housing is positive and that the housing 104 and footpad 108 are moving away from each other (block 736) and when the jerk value is negative and the housing 104 and footpad 108 are moving toward each other (block 740). In either case, the controller 124 deactivates the electrical current to the vibrational dampener 117 (block 744).

In process 700, the controller 124 activates and deactivates the electrical current supplied to the vibrational dampener 117 with reference to the identified jerk value. As described above, the controller 124 monitors the relative velocities of the housing 104 and the footpad 108 and identifies with reference to these two velocities the jerk of the housing 104 continuously during operation of the saw 100. In process 700, the controller 124 activates or deactivates the electrical current supplied to the vibrational dampener 117 at times when the product of the jerk and the relative velocities of the housing 104 and footpad 108 is at or near zero. Adjusting the vibrational dampener at these times reduces or eliminates a momentary mechanical shock that occurs when the mechanical resistance of the vibrational dampener changes during a large jerk in the housing and when the housing and footpad have a large relative velocity to each other.

Figure 8:
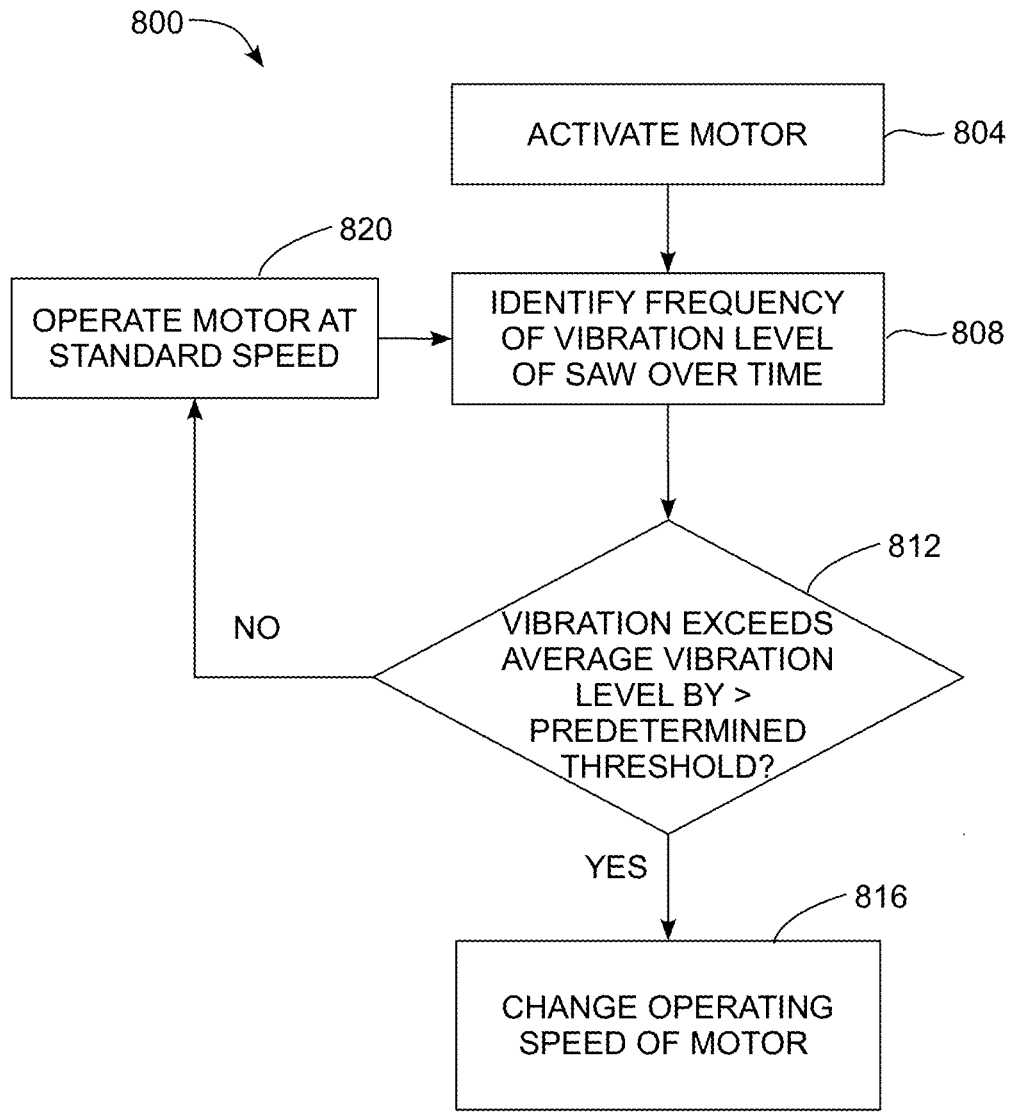
FIG. 8 is a block diagram of a process for mitigating resonant vibrations in a handheld power tool.

In some operating conditions, a work piece and a handheld tool begin to vibrate at a resonant frequency. While a semi-active vibrational dampener can reduce the magnitude of the resonant vibration, changing the operating speed of drive motor in the device can provide additional reductions in vibration experienced in the housing 104. FIG. 8 depicts a process 800 for adjusting the operating speed of a motor to mitigate resonant vibrations between a work piece and a handheld power tool such as the saw 100 of FIG. 1. Process 800 begins when the motor 118 activates to drive the handheld power tool (block 804). The activated power tool engages a work piece and the housing 104 vibrates during operation. The housing accelerometer 144 detects vibrations as a series of changing acceleration values that include vibrations originating in the work piece that are transmitted to the housing 104 over time (block 808). In one configuration the controller 124 stores vibration data for period of several seconds or minutes during which the saw 100 is activated, and identifies the average vibration during the time period. When the work piece does not experience resonating vibration, the identified level of vibration in the housing 104 remains within a predetermined threshold of the average vibration measured over time (block 812) and the saw continues to operate at a standard speed (block 820).

In some situations, the cutting action of the saw 100 or other forces exerted on the work piece generate a resonating vibration in the work piece, and the resonating vibration is transmitted to the housing 104. While the vibrational dampener 117 dampens vibrations generated in the work piece, a resonating vibration in the work piece may still elevate the measured vibration in the housing 104 to a level that exceeds the predetermined threshold above the time averaged vibration in the housing 104 (block 812). If the vibration threshold is exceeded, process 800 changes the operating speed of the motor to mitigate the resonant vibration generated in the work piece and reduce the total level of vibration in the housing 104 (block 816). In some configurations the controller 124 reduces or increases the operating speed of the motor 118 within a predetermined range around a standard operating speed, such as a range of up to twenty percent of the standard operating speed of the motor 118. In another configuration, the controller 124 selects multiple speeds for the motor 118 within a predetermined range around the standard operating speed of the motor 118 and identifies a vibration generated in the housing 104 for each of the selected operating speeds. The controller then selects the operating speed with the minimum identified vibration and operates the motor 118 at the selected speed. Process 800 changes the operating speed of the motor 118 in the saw 100 to reduce or eliminate resonant vibrations generated in a work piece while also maintaining an operating speed for the saw that enables efficient cutting of various work pieces.

In some operating conditions, the measured vibration is similar to the resonant frequency of the housing or a harmonic thereof. For example, one embodiment of the saw 100 has a resonant frequency of 25 Hz with first and second harmonic resonant frequencies of 50 Hz and 75 Hz, respectively. If the detected vibrational frequency is at or near one of resonant frequencies for the saw (block 812), then the controller 124 lowers the speed of the motor to reduce vibrations at the resonant frequency (block 816). The operating speed of the motor is reduced to change the resonant frequency of the housing to a different frequency than the vibration in the work piece. In one configuration, the motor operates with the reduced operating speed until the handheld power tool is deactivated and subsequently activated at the standard operating speed. In other configurations, the handheld power tool operates at the reduced operating speed for a predetermined time before returning to the standard operating speed and monitoring for additional resonant vibrations.

Figure 9:
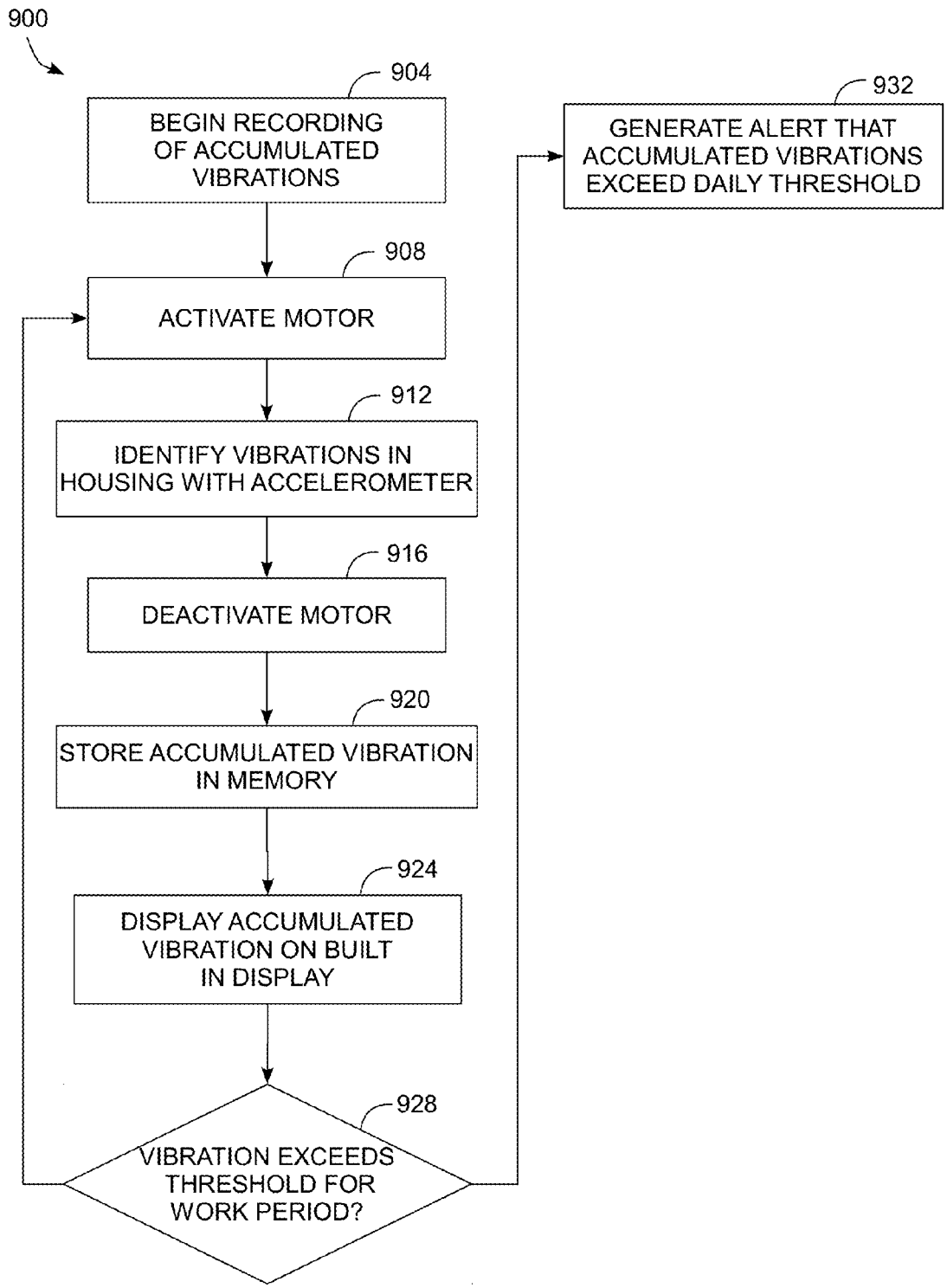
FIG. 9 is a block diagram of a process for recording the vibrational forces experienced by an operator of handheld power tool.

In some operating modes, the cumulative vibration that an operator of a handheld power tool experiences during a predetermined time period, such as a work shift, limits the amount of time that the operator may use the power tool within regulated bounds. FIG. 9 depicts a process 900 for measuring and informing an operator about the accumulated vibration experienced while operating a handheld power tool. Process 900 is described in conjunction with the saw 100 of FIG. 1 for illustrative purposes. Process 900 commences when a handheld power tool, such as the saw 100, begins to record accumulated data for vibrations generated during operation (block 904). In one configuration, an operator enters a command using the input device 156 to begin collection of accumulated vibrational information at the beginning of a work shift.

Figure 12:
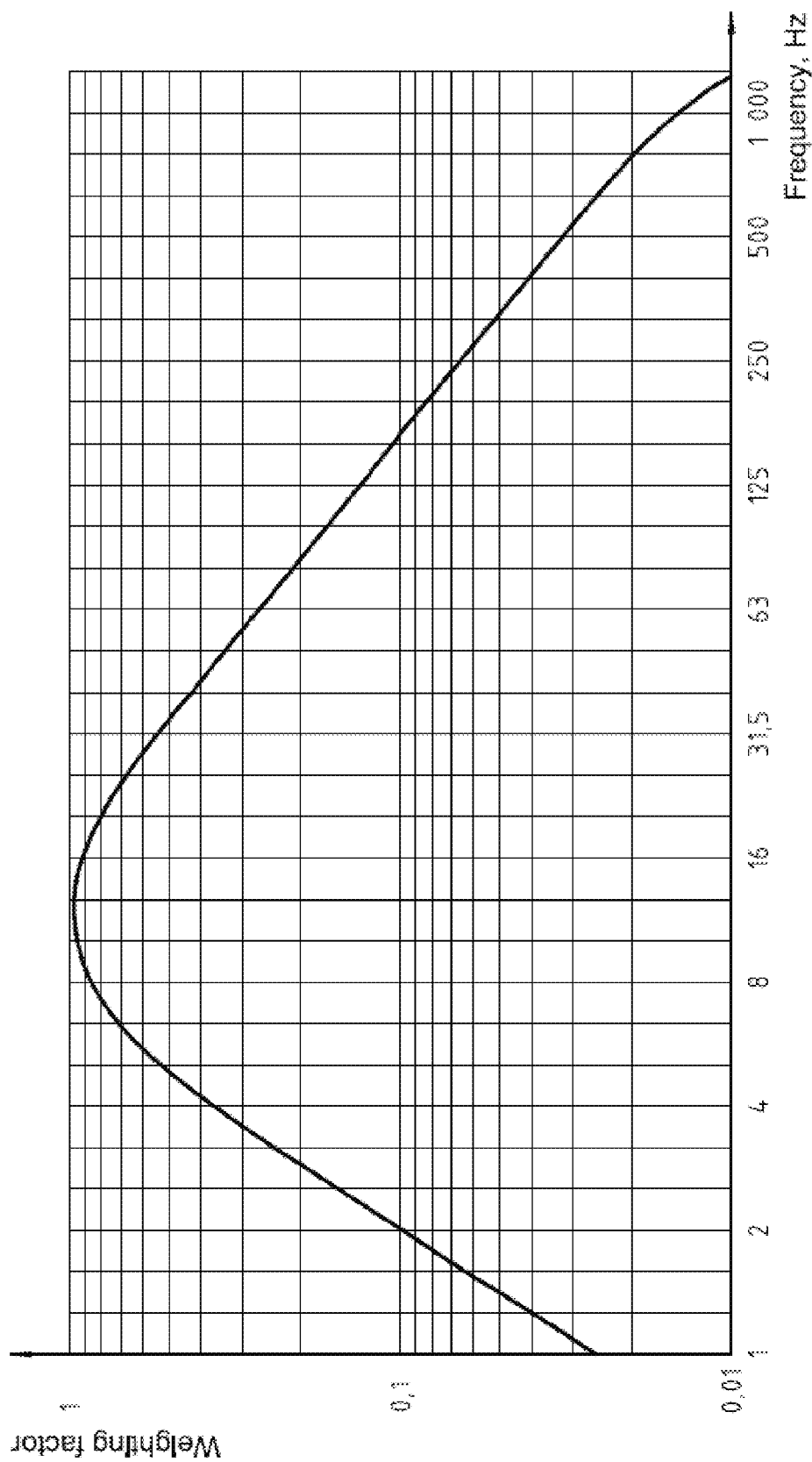
FIG. 12 is a prior art graph of weighting factors for different vibrational frequencies as used in the ISO-5439 standard.

During a work shift, the operator activates the motor 118 in the handheld saw 100 (block 908) and uses the saw while the controller 124 records information related to vibration (block 912) until the motor is deactivated (block 916). The controller 124 then stores an accumulated total of the detected vibration in an internal memory (block 920). In another configuration, the controller 124 stores the accumulated vibration information in the internal memory at regular intervals during operation of the motor 118, such as every 100 milliseconds. The controller 124 generates the accumulated vibration based on both the magnitude of vibrational forces measured using the housing accelerometer 144, and also a predetermined frequency weighting curve such as the ISO-5439 weighting curve depicted in FIG. 12. Since certain vibrational frequencies generate a larger physiological effect on the operator, the controller generates the accumulated vibration value with reference to the amplitude, frequency, and duration of vibrations generated during operation of the handheld saw 100. The saw 100 is configured to display data corresponding to the accumulated vibration to the operator after the saw is deactivated (block 924). In one embodiment, the saw displays a simplified output, such as a percentage or color code, which quickly notifies the operator of the amount of total vibration that has been experienced during the work shift.

Process 900 continues to measure and display the accumulated vibration that the operator experiences until the worker exceeds a predetermined vibrational limit (block 928). In a situation where the operator exceeds the limit during a work shift, the handheld saw 100 generates an alert using the display 154 to inform the operator that the limit for the work shift has been reached (block 932). To avoid distraction of the operator during operation, the display 154 shows the alert after the operator deactivates the handheld saw 100. In one configuration, the handheld saw 100 enters a mode where the motor 118 does not activate until the controller 124 is reset at the beginning of a subsequent work shift, or when a new operator begins to use the saw.

In various alternative configurations, process 900 may generate an immediate alert during use of the power tool instead of generating the alert after the power tool has been deactivated. The immediate alert can be used with power tools that remain activated for comparatively long periods of time. Some power tools that are shared by multiple operators during a single shift can include a sensor or input that enables the power tool to record separate accumulated vibration experienced by each of the operators. In another configuration, the saw 100 can be configured to identify and transmit the accumulated vibrational data to a computing device that tracks and records the accumulated vibrations experienced by one or more operators using one or more tools throughout a work shift. Thus, the accumulated vibrational exposure for each operator is monitored as the operator uses the saw 100 and various other tools that generate vibrations. The semi-active vibrational dampener 117 reduces the total accumulated vibration experienced by each operator during the work shift, and can enable a worker to complete a work shift without exceeding the limit for acceptable accumulated vibration.

It will be appreciated that variants of the above-described and other features and functions, or alternatives thereof, may be desirably combined into many other different systems, applications or methods. For example, while the foregoing embodiments depict a handheld reciprocating saw, other handheld power tools including rotary drills, screw drivers, hammer drills, reciprocating hammers, and the like can also include the semi-active vibration dampeners described herein. Various presently unforeseen or unanticipated alternatives, modifications, variations or improvements may be subsequently made by those skilled in the art that are also intended to be encompassed by the following claims.

What is claimed:

1. A handheld electrical power tool comprising:
    a housing forming a first grip configured to engage one hand of an operator and a second grip configured to engage another hand of the operator;
    an electrical motor located in the housing that is configured to drive a tool;
    a foot member outside the housing that is configured to engage a work piece and support the housing and the electrical motor with reference to the work piece;
    a movable member operatively connected to the housing and to the foot member, the movable member being configured to move from a first position to a second position in response to a movement of the foot member toward the housing and to move from the second position to the first position in response to a movement of the foot member away from the housing;
    a vibrational dampener positioned proximate to the foot member and operatively connected to the movable member, the vibrational dampener including a variable rheological material; and
    a controller located in the housing and operatively connected to the vibrational dampener, the controller being configured to selectively activate an electric current to adjust a mechanical resistance of the variable rheological material to dampen vibrational forces transmitted to the first grip and the second grip during operation of the electrical motor.

2. The handheld electrical power tool of claim 1, the variable rheological material essentially comprising a magnetorheological material.

3. The handheld electrical power tool of claim 2, the vibrational dampener further comprising:
    a dampener housing having an opening and an internal volume, a portion of the dampener housing engaging the housing;
    an elastomeric bellow forming a seal across the opening of the dampener housing and extending out of the internal volume;
    a plate contacting the movable member and the elastomeric bellow, the plate configured to move in response to the movable member moving between the first position and the second position;
    a cylindrical member positioned in the internal volume of the dampener housing and mechanically connected to the plate, the cylindrical member being configured to move within the inner volume in response to the plate moving;
    an electrical conductor formed around a circumference of the cylindrical member and configured to generate an electromagnetic field in response to the activated electric current; and
    a magnetorheological fluid placed in the internal volume.

4. The handheld electrical power tool of claim 3, the magnetorheological fluid having a first viscosity when the electromagnetic field is generated and a second viscosity in an absence of the electromagnetic field, the first viscosity being greater than the second viscosity.

5. The handheld electrical power tool of claim 1, further comprising:
    a first accelerometer located on the foot member;
    a second accelerometer located in the housing; and
    the controller being communicatively coupled to the first accelerometer and second accelerometer and the controller being further configured to:
        identify a relative motion between the foot member and the housing with reference to signals generated by the first accelerometer and the second accelerometer;
        identify a relative motion between the housing and an operator holding the housing with reference to the signals generated by the second accelerometer;
        activate an electric current to increase the mechanical resistance of the variable rheological material in response to the foot member moving away from the housing and the housing moving toward the operator;
        activate the electric current to increase the mechanical resistance of the variable rheological material in response to the foot member moving toward the housing and the housing moving away from the operator;
        deactivate the electric current to decrease the mechanical resistance of the variable rheological material in response to the foot member moving away from the housing and the housing moving away from the operator; and deactivate the electric current to decrease the mechanical resistance of the variable rheological material in response to the foot member moving toward the housing and the housing moving toward the operator.

6. The handheld electrical power tool of claim 1, the vibrational dampener being configured to hold a volume of the variable rheological material of between approximately 30 cubic centimeters and 50 cubic centimeters.

7. The handheld electrical power tool of claim 1, the vibrational dampener being configured to bias the movable member into the first position.

8. The handheld electrical power tool of claim 1 further comprising:
a position sensor located in the housing and configured to generate signals corresponding to a distance between the foot member and the housing;
the controller being communicatively coupled to the position sensor and further configured to:
identify a relative motion between the foot member and the housing with reference to the signals generated by the position sensor;
activate the electric current to increase the mechanical resistance of the variable rheological material in response to the foot member moving toward the housing; and
deactivate the electric current to decrease the mechanical resistance of the variable rheological material in response to the foot member moving away from the housing.

9. The handheld electrical power tool of claim 1, the controller being configured to activate the electrical current to adjust the mechanical resistance of the variable rheological material in the vibrational dampener to dampen a plurality of vibrations having a range of frequencies of less than 300 Hertz.

10. The handheld electrical power tool of claim 1, the movable member being operatively connected to the housing through a pivot and the movable member being configured to pivot between the first position and the second position.

11. The handheld electrical power tool of claim 1, the movable member being operatively connected to the housing through a railing and the movable member being configured to slide between the first position and the second position.

12. A method of dampening vibration in a handheld electrical power tool comprising:
driving a tool with an electrical motor located in a housing of the handheld electrical power tool, the housing having a first hand grip and a second hand grip;
moving a movable member mechanically connected between the housing and a foot member configured to support the handheld electrical power tool with reference to a work piece, the foot member being between the work piece and the first and the second hand grips and the movable member moving from a first position to a second position in response to the foot member moving toward the housing and from the second position to the first position in response to the foot member moving away from the housing during the driving of the tool with the electrical motor; and
selectively activating an electric current to adjust a mechanical resistance of a variable rheological material in a vibrational dampener located proximate to the foot member to dampen the vibrational force transmitted between the foot member and the housing.

13. The method of claim 12, the variable rheological material essentially comprising a magnetorheological material.

14. The method of claim 13, the selective activation of the electric current generating a magnetic field around a magnetorheological fluid, a viscosity of the magnetorheological fluid increasing from a first viscosity to a second viscosity in response to the generation of the electromagnetic field.

15. The method of claim 12 further comprising:
identifying a relative motion between the foot member and the housing with reference to signals generated by the first accelerometer and the second accelerometer;
identifying a relative motion between the housing and an operator holding the housing with reference to the signals generated by the second accelerometer;
activating an electric current to increase the mechanical resistance of the variable rheoloqical material in response to the foot member moving away from the housing and the housing moving toward the operator;
activating the electric current to increase the mechanical resistance of the variable rheoloqical material in response to the foot member moving toward the housing and the housing moving away from the operator;
deactivating the electric current to decrease the mechanical resistance of the variable rheoloqical material in response to the foot member moving away from the housing and the housing moving away from the operator; and
deactivating the electric current to decrease the mechanical resistance of the variable rheoloqical material in response to the foot member moving toward the housing and the housing moving toward the operator.

16. The method of claim 12 further comprising:
biasing the movable member into the first position with the vibrational dampener.

17. The method of claim 12 further comprising:
operating the electrical motor to drive the tool at a first speed;
identifying an average level of vibration in the housing over a predetermined time period with reference to signals generated by an accelerometer located in the housing while the electrical motor operates at the first speed;
identifying a second level of vibration in the housing while the electrical motor operates the first speed; and
operating the electrical motor to drive the tool at a second speed that is different than the first speed in response to the second identified level of vibration in the housing exceeding the average level of vibration by more than a predetermined threshold.

18. The method of claim 12 further comprising:
identifying an amplitude, frequency, and duration of vibration in the housing while the electric motor drives the tool;
identifying a value corresponding to an accumulated vibration generated in the housing with reference to the amplitude, frequency, and duration of the vibration; and
generating an alert signal in response to the identified value of the accumulated vibration exceeding a predetermined threshold.

* * * * *